(12) United States Patent
Lerner

(10) Patent No.: US 10,158,613 B1
(45) Date of Patent: Dec. 18, 2018

(54) COMBINED HIDDEN DYNAMIC RANDOM-ACCESS DEVICES UTILIZING SELECTABLE KEYS AND KEY LOCATORS FOR COMMUNICATING RANDOMIZED DATA TOGETHER WITH SUB-CHANNELS AND CODED ENCRYPTION KEYS

(71) Applicant: Daniel Maurice Lerner, Missouri City, TX (US)

(72) Inventor: Daniel Maurice Lerner, Missouri City, TX (US)

(73) Assignee: IronClad Encryption Corporation, Houston, TX (US)

( * ) Notice: Subject to any disclaimer, the term of this patent is extended or adjusted under 35 U.S.C. 154(b) by 0 days.

(21) Appl. No.: 16/006,011

(22) Filed: Jun. 12, 2018

Related U.S. Application Data

(63) Continuation-in-part of application No. 16/005,040, filed on Jun. 11, 2018, and a continuation-in-part of
(Continued)

(51) Int. Cl.
*H04L 29/06* (2006.01)
*H04L 9/08* (2006.01)
(Continued)

(52) U.S. Cl.
CPC .... *H04L 63/0457* (2013.01); *G06F 17/30581* (2013.01); *H04L 1/0041* (2013.01);
(Continued)

(58) Field of Classification Search
CPC .................................................. H04L 63/0457
See application file for complete search history.

(56) References Cited

U.S. PATENT DOCUMENTS

| 4,578,530 A | 3/1986 | Zeidler |
| 5,227,613 A * | 7/1993 | Takagi ................. G06K 7/0008 235/380 |

(Continued)

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year: 2003).*

(Continued)

*Primary Examiner* — Bradley Holder
(74) *Attorney, Agent, or Firm* — Guerry L. Grune; ePatentManager.com

(57) ABSTRACT

Devices that conceal transmission(s) transmitted to and/or reveal transmission(s) received from these devices comprising at least one executable coded cipher key(s) at least one executable coded encryption key (ECEK) device that securitizes transmission(s) that uses executable coded key(s), and at least one executable coded decryption key (ECDK) device that reveals transmission(s) such that a combined device is a RDDS/ECDK device that transmits randomized data with data sub-channels and with ECEKs; and that also utilizes at least one executable coded cipher key(s), such that transmission(s) sent to an encrypter/decrypter memory that stores transmission(s) while the transmission(s) is concealed and/or revealed. When concealing/revealing operation(s) are completed the transmission(s) is sent to at least one transmitter such that the concealing/revealing operation of the transmission(s) is controlled and manipulated by the executable coded cipher key(s), wherein the executable coded cipher key(s) remain in the computer memory long enough to achieve securitization completion.

10 Claims, 14 Drawing Sheets

Related U.S. Application Data application No. 16/005,134, filed on Jun. 11, 2018, and a continuation-in-part of application No. 16/005,281, filed on Jun. 11, 2018, and a continuation-in-part of application No. 16/005,871, filed on Jun. 12, 2018, and a continuation-in-part of application No. 16/005,918, filed on Jun. 12, 2018, and a continuation-in-part of application No. 16/005,968, filed on Jun. 12, 2018.

(60) Provisional application No. 62/540,352, filed on Aug. 2, 2017, provisional application No. 62/518,281, filed on Jun. 12, 2017, provisional application No. 62/518,337, filed on Jun. 12, 2017, provisional application No. 62/518,371, filed on Jun. 12, 2017, provisional application No. 62/540,266, filed on Aug. 2, 2017, provisional application No. 62/540,307, filed on Aug. 2, 2017, provisional application No. 62/540,326, filed on Aug. 2, 2017.

(51) Int. Cl.
  *H04L 1/00* (2006.01)
  *G06F 17/30* (2006.01)
  *H04L 9/14* (2006.01)

(52) U.S. Cl.
  CPC ............ *H04L 9/0861* (2013.01); *H04L 9/14* (2013.01); *H04L 63/0471* (2013.01); *H04L 63/102* (2013.01); *H04L 2209/08* (2013.01)

(56) References Cited

U.S. PATENT DOCUMENTS

| | | | |
|---|---|---|---|
| 5,825,890 A | 10/1998 | Elgamal et al. | |
| 6,154,636 A * | 11/2000 | Wright | H04B 7/18506 340/517 |
| 6,157,722 A | 12/2000 | Lerner et al. | |
| 6,160,998 A * | 12/2000 | Wright | H04B 7/18506 340/945 |
| 6,466,780 B1 | 10/2002 | Geiselman et al. | |
| 6,522,867 B1 * | 2/2003 | Wright | G05D 1/0055 340/945 |
| 6,766,161 B2 | 7/2004 | Geiselman et al. | |
| 6,959,086 B2 | 10/2005 | Ober et al. | |
| 7,181,016 B2 | 2/2007 | Cross et al. | |
| 7,382,883 B2 | 6/2008 | Cross et al. | |
| 8,205,091 B2 * | 6/2012 | Buckley | G06F 21/6209 713/182 |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 2003/0120938 A1 | 6/2003 | Mullor | |
| 2005/0076198 A1 * | 4/2005 | Skomra | H04L 9/321 713/156 |
| 2005/0228986 A1 * | 10/2005 | Fukasawa | H04L 9/0891 713/156 |
| 2011/0107086 A1 * | 5/2011 | Soliman | H04L 9/0822 713/155 |
| 2012/0134495 A1 | 5/2012 | Liu | |
| 2012/0198538 A1 | 8/2012 | Spring et al. | |
| 2013/0219189 A1 | 8/2013 | Simmons | |
| 2013/0332025 A1 * | 12/2013 | Ziarno | G05B 23/0213 701/33.4 |
| 2014/0085050 A1 * | 3/2014 | Luna | G07C 9/00087 340/5.82 |
| 2014/0279528 A1 * | 9/2014 | Slaby | H04L 63/0853 705/44 |
| 2014/0282153 A1 * | 9/2014 | Christiansen | G06Q 30/0201 715/765 |
| 2015/0169882 A1 * | 6/2015 | Saxena | G06F 21/36 726/17 |
| 2016/0294794 A1 * | 10/2016 | Mancic | H04L 63/061 |
| 2016/0337328 A1 * | 11/2016 | Sallam | H04L 63/0861 |
| 2017/0012642 A1 | 1/2017 | Declercq et al. | |
| 2017/0068804 A1 | 3/2017 | Wichmann et al. | |
| 2017/0118207 A1 * | 4/2017 | Madhu | H04L 63/0861 |

OTHER PUBLICATIONS

Papadimitratos et al.; Secure data communication in mobile ad hoc networks; Published in: IEEE Journal on Selected Areas in Communications ( vol. 24, Issue: 2, Feb. 2006 ); pp. 343-356; IEEE Xplore (Year: 2006).*

Coppenhagen, Uri. International Search Report. Israel Patent Office. Dated Sep. 17, 2018, Jerusalem, Israel.

Coppenhagen, Uri. Written Opinion of the International Searching Authority. Israel Patent Office. Dated Sep. 2018, Jerusalem, Israel.

* cited by examiner

COMBINED HIDDEN DYNAMIC RANDOM-ACCESS DEVICES UTILIZING SELECTABLE KEYS AND KEY LOCATORS FOR COMMUNICATING RANDOMIZED DATA TOGETHER WITH SUB-CHANNELS AND CODED ENCRYPTION KEYS

PRIORITY STATEMENT

This application is a nonprovisional conversion of and takes priority under 119(e) of U.S. Provisional Application No. 62/540,352, entitled "Combined Hidden Dynamic Random Access Devices and Encryption Systems Utilizing Selectable Keys and Key Locators for Communicating Randomized Encrypted Data Together with Sub-Channels and Executable Coded Encryption Keys", filed Aug. 2, 2017.

PRIORITY STATEMENT

This application is also a continuation-in-part of U.S. Nonprovisional application Ser. No. 16/005,968 filed Jun. 12, 2018 and entitled, "Executable Coded Cipher Keys", which is a nonprovisional conversion of U.S. Provisional Application No. 62/540,326 filed Aug. 2, 2017 and entitled, "Executable Coded Cipher Keys".

This application is also a continuation-in-part of U.S. Nonprovisional application Ser. No. 16/005,918 filed Jun. 12, 2018 and entitled, "Devices for Transmitting and Communicating Randomized Data Utilizing Sub-Channels", which is a nonprovisional conversion of U.S. Provisional Application No. 62/540,307 filed Aug. 2, 2017 and entitled, "Devices for Transmitting and Communicating Randomized Encrypted Data Utilizing Sub-Channels".

This application is also a Continuation-in-part of U.S. Nonprovisional application Ser. No. 16/005,871 filed Jun. 12, 2018 and entitled, "Devices that Utilize Random Tokens Which Direct Dynamic Random Access," which is a nonprovisional conversion of U.S. Provisional Application No. 62/540,266, filed Aug. 2, 2017 and entitled, "Selectable Key and Key Locator for A Hidden Dynamic Random Access Encryption System".

This application is also a continuation-in-part of U.S. Nonprovisional application Ser. No. 16/005,281 filed Jun. 11, 2018 and entitled, "User-Wearable Secured Devices Provided Assuring Authentication and Validation of Data Storage and Transmission", which is a nonprovisional conversion of 62/518,371, filed Jun. 12, 2017 and entitled, "User-Wearable Secured Devices Provided with Encryption Assuring Authentication and validation of Data Storage and Transmission".

This application is also a continuation-in-part of U.S. Nonprovisional application Ser. No. 16/005,134 filed Jun. 11, 2018 and entitled "Securitization of Temporal Digital Communications Via Authentication and Validation for Wireless User and Access Devices" which is a nonprovisional conversion of U.S. Provisional Application entitled "Securitizing Temporal Digital Communications Via Authentication and Validation for Wireless User and Access Devices" with Ser. No. 62/519,337, filed Jun. 12, 2017.

This application is also a continuation-in-part of U.S. Nonprovisional application Ser. No. 16/005,040, filed Jun. 11, 2018 and entitled "Securitization of Temporal Digital Communications with Authentication and Validation of User and Access Devices", which is a nonprovisional conversion of U.S. Provisional Application entitled "A System for Securing and Encrypting Temporal Digital Communications with Authentication and Validation of User and Access Devices" with Ser. No. 62/518,281 filed Jun. 12, 2017.

FIELD OF INVENTION

The technical field comprises cyber security. More specifically, the present disclosure relates to randomization and securitization of communications, and more particularly to devices and an associated system that conceals and reveals signals between devices to ensure that the communications are discoverable by only designated third parties. Methods and devices for securitization of these (primarily digital and normally two-way) communications using applications that may be combined with authorization and validation for receiving, storing, and retrieval of electronic, optical, and/or electro-optical communications in the form of voice, data, or optical transmissions, are also included.

The present disclosure includes devices and a system that is specifically suited for data transmission applications that require a need for discrete communications, preserving privacy of information, electronic commerce transactions, electronic mail communications and the like.

BACKGROUND

As it is known in cryptology, codification techniques (such as encryption) using standard and evolving computerized computations or algorithms are developed so that data exposed to undesirable third parties are concealed making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted". Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. No. 4,200,770 entitled, Cryptographic Apparatus and Method, invented by Hellman, Diffie and Merkle; U.S. Pat. No. 4,218,582 entitled, Public Key Cryptographic Apparatus and Method, invented by Hellman and Merkle; U.S. Pat. No.

4,405,829 entitled Cryptographic Communications System and Method, invented by Rivest, Shamir and Adleman; and U.S. Pat. No. 4,424,414 entitled, Exponentiation Cryptographic Apparatus and Method, invented by Hellman and Pohlig. For a general discussion of network security, refer to Network and Internetwork Security, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort.

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems.

Simultaneously, there has been an increased need for mobility of transmissions including data and signals by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Known encryption systems for these devices include the "Data Encryption Standard" ("DES"), which was initially standardized by the "American National Bureau of Standards", currently "National Institute of Standards and Technology" ("NB S" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device. Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

Many prior art methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine them to form the decryption key. Such solutions are often implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

Current file encryption systems provide a technique for a general-purpose computer to encrypt or decrypt computer-based files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Symmetric file systems use an identical key to encrypt a file as the key used to decrypt the encrypted file. Certain file encryption systems utilize a cryptographic process or random number generator to derive a random symmetric key known as the file encryption key (FEK). The FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming, but becoming less so as computer speeds and operations are constantly improving.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

In addition, there is a need to better secure portable storage apparatus and method of encrypting and sealing digital information files and storing them in the device's integral or removable memory, or alternatively on the host device's memory or other ancillary memory storage devices, while operating under cryptographically protected security policies for transport and authorized access to such digital information.

There is also a need for secure physical and logical transport of data to and from multiple recipients. To this end, it is desirable to provide a means of securely transporting data from one place to another, if the user has to carry the data or physically transport the data and the secure encryption device, and somehow communicate the information necessary to log on and access the data by another authorized user. What is required are a multiplicity of methods to securely transport the encrypted data, either physically or logically, between an Originator user and one or more Receivers.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

These encrypted and decrypted data and data communications require special encryption techniques essential to denying fraudulent or otherwise unauthorized third parties with the ability to access sealed encrypted transmissions for data at rest as well as for data on the move. In all cases here within, the terms communication processor and communication processor are synonymous unless there is an illogical reference regarding use of the term communication processor in lieu of communication processor.

The present disclosure relates generally to a cryptographic management scheme that provides for network security, mobile security and specifically and more particularly relates to devices and a system for creating and manipulating encryption keys without risking the security of the key. The present disclosure addresses all of the needs described directly herein, as well as described earlier above.

SUMMARY

The present disclosure and associate inventiveness can be described as one or more combined devices that encrypt data transmitted to and/or decrypt data received from the devices that utilize one or more master keys comprising;

at least one encrypter or decrypter or both an encrypter and a decrypter such that encryption or decryption or both encryption and decryption of the data or associated data files or both data and data files utilize one or more master keys and one or more key selectors, wherein the master keys and key selectors produce a specific set of one or more encryption keys that encrypt and/or decrypt the data or associated data files or both data and data files such that one or more key selectors coincide with at least one value that directly corresponds with created cipher data or cipher data files or both cipher data and cipher data files, and wherein the key selectors and the cipher data and the cipher data files produce result data and result data files such that the cipher data and cipher data files together with the result data and result data files are sealed in that produced encrypted data and encrypted data files are only encrypted and decrypted with one or more master keys and one or more key selectors, wherein the master keys are executable coded cipher keys and wherein the data or associated data files or both the data and the associated data files are a form of transmission(s) that are signals and wherein the one or more combined systems further comprise;
a forward error correction encoder that encodes transmission(s) and provides a known degree of forward error correction to the transmission(s);
a sub-channel encoder;
a transmission(s) combiner that combines transmission(s) from the forward error correction encoder with transmission(s) from the sub-channel encoder;
a transmission(s) encrypter that receives combined transmission(s) from the transmission(s) combiner, wherein the transmission(s) encrypter receives one or more encrypter keys (KE) and the combined transmission(s), such that the combined transmission(s) are encrypted by the transmission(s) encrypter and sent to a transmission(s) transmitter and wherein the transmission(s) are in a form of cipher text;
a transmission(s) receiver that receives the cypher text and sends the cypher text to a transmission(s) decrypter, such that the cypher text is decrypted and
wherein the one or more combined systems further comprise;
at least one executable coded cipher key(s), and
coded encryption key (ECEK) device that securitizes transmission(s) that uses executable coded cipher key(s),
at least one executable coded decryption key (ECDK) device that decrypts transmission(s) that also uses at least one executable coded cipher key(s),
such that a combined device is a RDDS/ECDK device that transmits randomized encrypted data with data sub-channels and with executable coded encryption keys;
at least one computer processing unit (CPU) with computational capabilities that is connected to and controls a computer memory via an address bus and a data bus such that the address bus accesses a designated range of computer memories and range of memory bits and the data bus provides a flow of transmission(s) into and out of the CPU and computer memory,
and wherein the computer memory contains encrypter/decrypter memory that possesses at least one encryption space location and at least one decryption space location for the executable coded cipher key(s),
such that transmission(s) is sent to the encrypter/decrypter memory that stores transmission(s) while the transmission(s) is encrypted or decrypted or both encrypted and decrypted
and wherein, when encryption/decryption is completed the transmission(s) is sent to at least one transmitter such that encryption/decryption of these transmission(s) is controlled and manipulated by the executable coded cipher key(s), wherein the executable coded cipher key(s) remain in the computer memory and achieves encryption/decryption completion.

In several embodiments, the key selectors themselves are encrypted and decrypted.

In addition, the executable cipher keys contain meta data.

For one or more combined devices described above, these devices comprise a real or virtual master distributed auto-synchronous array (DASA) database or both one or more real and virtual master distributed auto-synchronous array (DASA) databases located within or external to the one or more combined devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein the one or more partial user and access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users.

Here, the master and partial DASA databases analyze and provide information in a form of data and act to control one or more output devices,
wherein the output devices create user devices.

In a further embodiment, the one or more combined systems that encrypt data transmitted to or decrypt data or both transmit and decrypt data received from the one or more combined systems that utilize one or more master keys comprising;
at least one encrypter or decrypter or both an encrypter and a decrypter such that encryption or decryption or both encryption and decryption of said data or associated data files or both data and data files utilize one or more master keys and one or more key selectors, wherein the master keys and key selectors produce a specific set of one or more encryption keys that encrypt and/or decrypt the data or associated data files or both data and data files such that one or more key selectors coincide with at least one value that directly corresponds with created cipher data or cipher data files or both cipher data and cipher data files, and wherein the key selectors and the cipher data and the cipher data files produce result data and result data files such that the cipher data and cipher data files together with the result data and result data files are sealed in that produced encrypted data and encrypted data files are only encrypted and decrypted with one or more master keys and one or more key selectors, wherein the master keys are executable coded cipher keys and
wherein the data or associated data files or both the data and the associated data files are a form of transmission(s) that are signals and
wherein the one or more combined systems further comprises;
a forward error correction encoder that encodes transmission(s) and provides a known degree of forward error correction to the transmission(s);
a sub-channel encoder;
a transmission(s) combiner that combines transmission(s) from the forward error correction encoder with transmission(s) from the sub-channel encoder;
a transmission(s) encrypter that receives combined transmission(s) from transmission(s) combiner, wherein the transmission(s) encrypter receives one or more encrypter keys (KE) and the combined transmission(s), such that the combined transmission(s) are encrypted by the transmission(s) encrypter and sent to a transmission(s) transmitter and wherein the transmission(s) are in a form of cipher text;
a transmission(s) receiver that receives the cypher text and sends the cypher text to a transmission(s) decrypter, such that the cypher text is decrypted and
wherein the one or more combined systems further comprise;
at least one executable coded cipher key(s), and at least one executable coded encryption key (ECEK) device that encrypts transmission(s) that uses executable coded cipher key(s), and at least one executable coded decryption key (ECDK) device that decrypts transmission(s) that also uses at least one executable coded cipher key(s), such that a combined device is a RDDS/ECDK device that transmits randomized encrypted data with data sub-channels and with executable coded encryption keys;

at least one computer processing unit (CPU) with computational capabilities that is connected to and controls a computer memory via an address bus and a data bus such that the address bus accesses a designated range of computer memories and range of memory bits and the data bus provides a flow of transmission(s) into and out of the CPU and computer memory, and wherein the computer memory contains encrypter/decrypter memory that possesses at least one encryption space location and at least one decryption space location for the executable coded cipher key(s), such that transmission(s) is sent to the encrypter/decrypter memory that stores the transmission(s) while the transmission(s) is encrypted or decrypted or both encrypted and decrypted and wherein, when encryption/decryption is completed the transmission(s) is sent to at least one transmitter such that encryption/decryption of the transmission(s) is controlled and manipulated by the executable coded cipher key(s), wherein the executable coded cipher key(s) remain in the computer memory and achieves encryption/decryption completion.

In at least several embodiments, the key selectors themselves are encrypted and decrypted.

In addition, the executable cipher keys contain meta data.

For the one or more combined systems described above, a real or virtual master distributed auto-synchronous array (DASA) database or both one or more real and virtual master distributed auto-synchronous array (DASA) databases located within or external to the one or more combined systems that at least stores and retrieves data and that includes at least two or more partial distributed auto-synchronous array (DASA) databases exists, wherein the partial DASA databases function in either an independent manner, a collaborative manner or both an independent and collaborative manner, and wherein the master and partial DASA databases allow for bi-directional transmission of data to and from multiple partial user devices, to and from multiple partial access devices or to and from both partial user and partial access devices, wherein the one or more partial user and access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users.

Here, the one or more combined systems provide master and partial DASA databases analyze and provide information in a form of data and act to control one or more output devices, wherein the output devices create user devices.

BRIEF DESCRIPTION OF THE FIGURES

So that the above recited features and advantages of the present disclosure can be understood in detail, a more particular description of the invention and reference to embodiments are provided and illustrated in the appended figures. It is to be noted, however, that the appended drawings illustrate only typical embodiments of the present disclosure and are therefore not to be considered limiting the scope or other equally effective embodiments.

DETAILED DESCRIPTION

Figure 1:
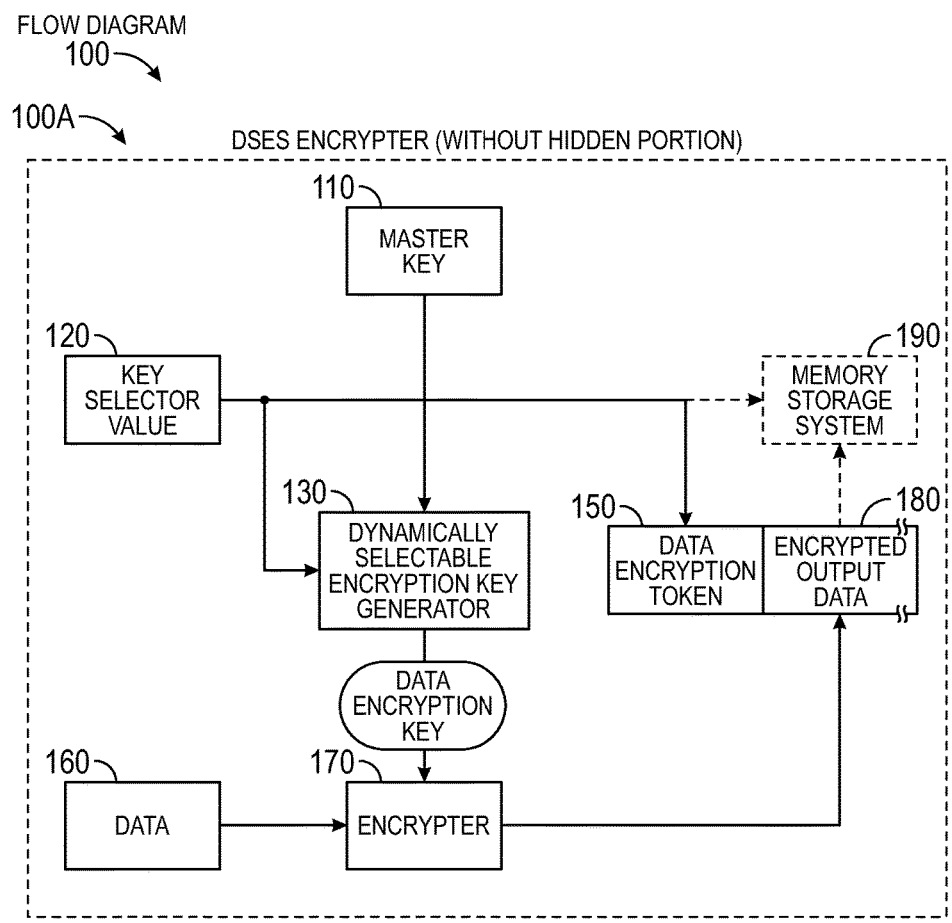
FIG. 1 is a flow diagram for the Dynamically Selectable Encryption System (DSES) without the Hidden Portion

Specifically, FIG. 1 is a flow diagram (100) for operation of the Dynamically Selectable Encryption System (DSES) Encrypter (100 A) without the Hidden Portion. The master key (110) is used by a dynamically selectable encryption key generator (130) together with the key selector value (120) to produce a data encryption key (KE) in a dynamic fashion. The key (KE) maybe changed at any time based upon a change in the key selector value (120). The key selector value (120) is sent to the decryption token (150). Encrypter (170) receives data (160) which may be in the form of plaintext and encrypts the data according to the value of the key (KE). Encrypted output data (180) is accepted from encrypter (170) which may be provided in the form of cypher-text. The combination of the decryption token (150) and the encrypted output data (180) now becomes available as encrypted communication signals.

The encryption process described above is for dynamically encrypted data on the move. For dynamically encrypted data at rest, shown as an optional feature by using dashed lines, the decryption token (150) is utilized by a memory storage system (190) as the block address to store the encrypted output data (180) at that specific block address. In this manner every block of memory in the memory storage system is encrypted with a unique encryption key (KE).

Figure 2:
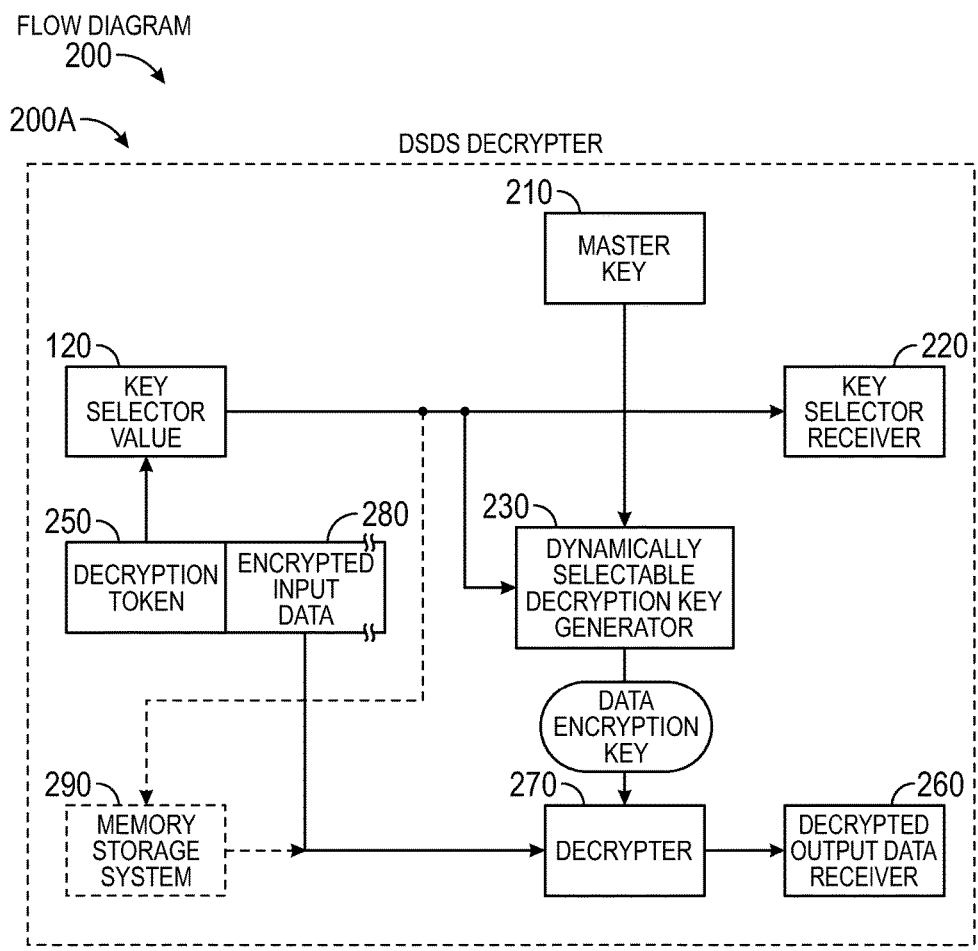
FIG. 2 is a flow diagram for the Dynamically Selectable Decryption System (DSDS) without the Hidden Portion

FIG. 2 is a flow diagram (200) for operation of the Dynamically Selectable Decryption System (DSDS) Decrypter (200A) without the Hidden Portion. The master key (210) has the same value as its matching master key (110) for the DSES as described in FIG. 1. The combination of the decryption token (150) and the encrypted output data (180) which has become available as communication signals (see FIG. 1) are received as a decryption token (250) and as encrypted input data (280).

The decryption token (250) becomes the key selector value (120). The master key (210) is used by a dynamically selectable decryption key generator (230) together with the key selector value (120) to produce a decryption key (KD) in a dynamic fashion. The decryption key (KD) maybe changed at any time based upon the value of the key selector (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector value (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically decrypted data on the move. For dynamically decrypted data at rest, shown as an optional feature by using dashed lines, the key locater (120) is utilized by a memory storage system (290) as the block address to recover the encrypted output data (180) at that specific block address. In this manner every block of memory in the memory storage system is encrypted and decrypted with a unique encryption key (KE).

Figure 3:
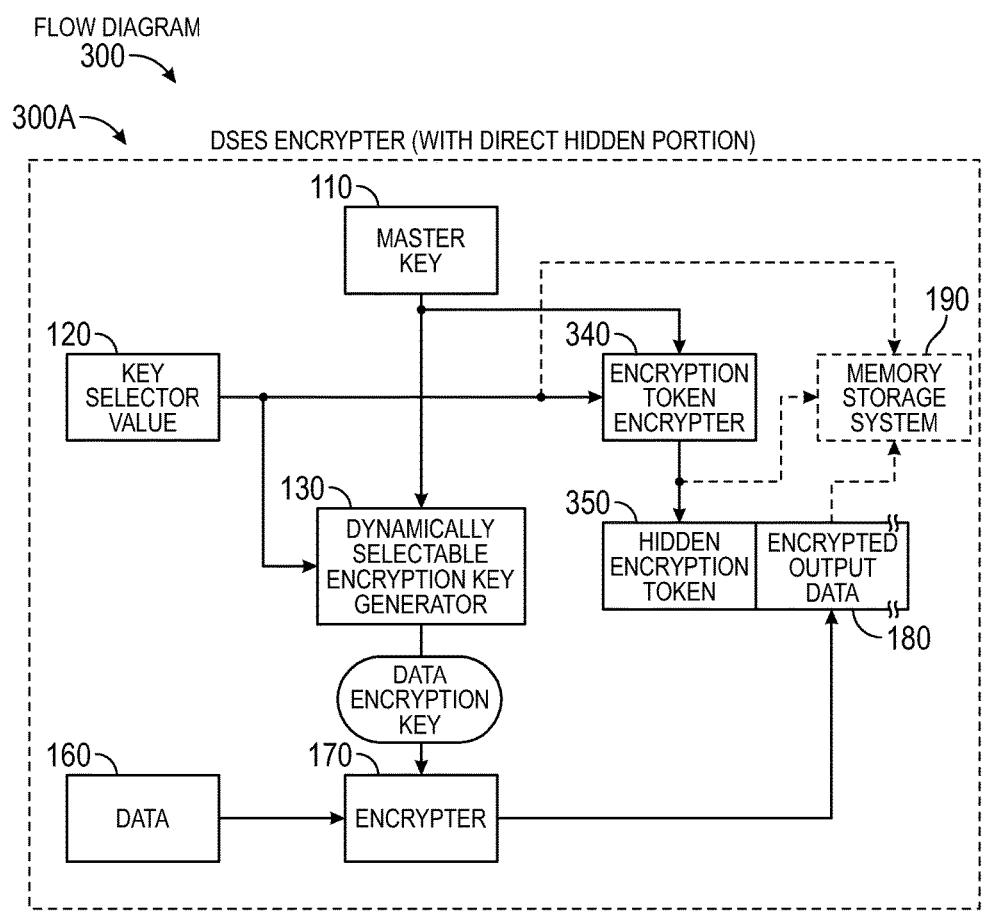
FIG. 3 is a flow diagram that describes the Dynamically Selectable Encryption System (DSES) with the Hidden Portion

FIG. 3 is a flow diagram (300) for operation of the Dynamically Selectable Encryption System (DSES) Encrypter (300A) with a Direct Hidden Portion. The master key (110) is used by a dynamically selectable encryption key generator (130) together with the key selector (120) to produce a data encryption key (KE) in a dynamic fashion. The key (KE) maybe changed at any time based upon a change in the key selector value (120). The key selector value (120) is sent to an encryption token encrypter (340) along with the master key (110). The encryption token encrypter (340) encrypts the key selector value (120) and produces a hidden encryption token (350). Encrypter (170) receives data (160) which may be in the form of plaintext and encrypts the data according to the value of the key (KE). Encrypted output data (180) is accepted from encrypter (170) which may be provided in the form of cyphertext. The combination of the hidden encryption token (350) and the encrypted output data (180) now becomes available as encrypted communication signals.

The encryption process described above is for dynamically encrypted data on the move. For dynamically encrypted data at rest, shown as an optional feature by using dashed lines, the key selector value (120) or the hidden decryption token (350) is utilized by a memory storage system (190) as the block address to store the encrypted output data (180) at that specific block address. In this manner every block of memory in the memory storage system is encrypted with a unique encryption key (KE).

Figure 4:
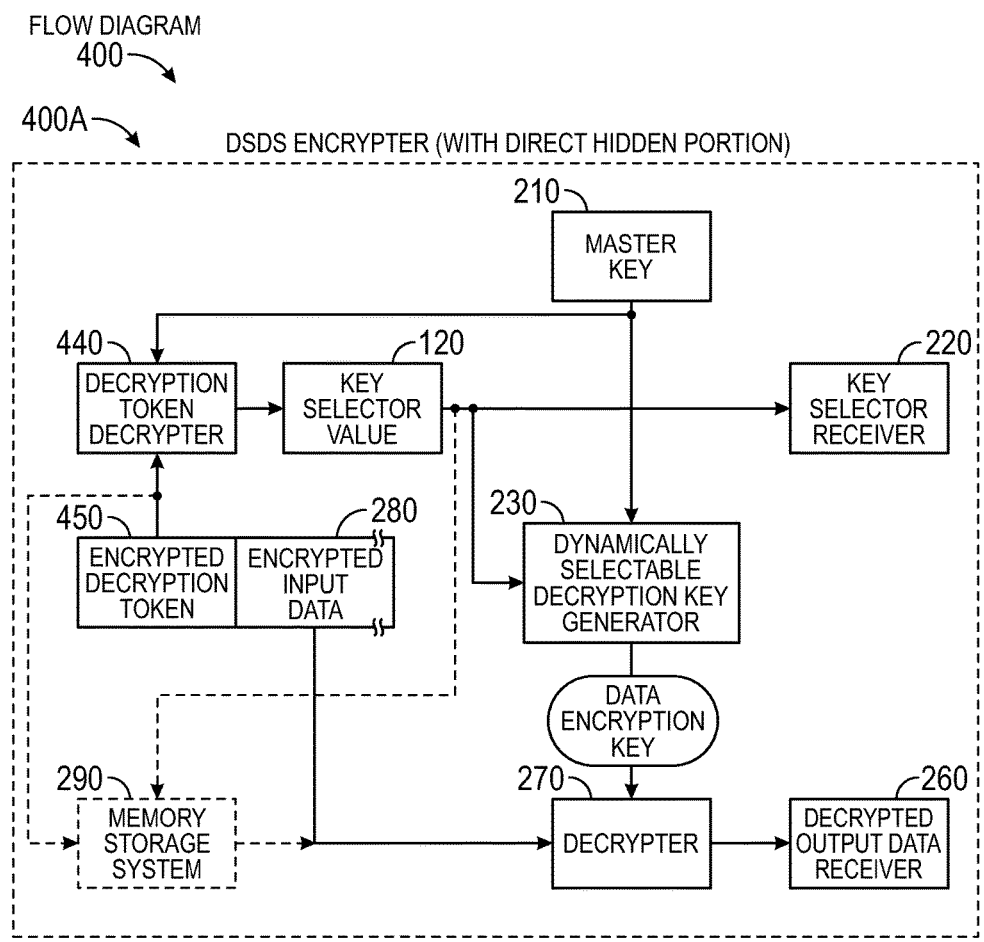
FIG. 4 is a flow diagram that describes the Dynamically Selectable Decryption System (DSDS) with the Hidden Portion

FIG. 4 is a flow diagram (400) for operation of the Dynamically Selectable Decryption System (DSDS) Decrypter (400A) with a Direct Hidden Portion. The master key (210) has the same value as its matching master key (110) for the DSES as described in FIG. 1. The combination of the hidden encryption token (350) and the encrypted output data (180) which has become available as communication signals (see FIG. 3) are received as an encrypted decryption token (450) and as encrypted input data (280).

The encrypted decryption token (450) is sent to a decryption token decrypter (440) along with the master key (210). The decryption token decrypter (440) decrypts the encrypted decryption token (450) and produces the key selector value (120). The master key (210) is used by a dynamically selectable decryption key generator (230) together with the key selector value (120) to produce a decryption key (KD) in a dynamic fashion. The decryption key (KD) maybe changed at any time based upon the value of the key selector value (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically decrypted data on the move. For dynamically decrypted data at rest, shown as an optional feature by using dashed lines, the key selector value (120) or the encrypted decryption token (450) is utilized by a memory storage system (290) as the block address to recover the encrypted output data (180) at that specific block address. In this manner every block of memory in the memory storage system is encrypted and decrypted with a unique encryption key (KE).

Figure 5:
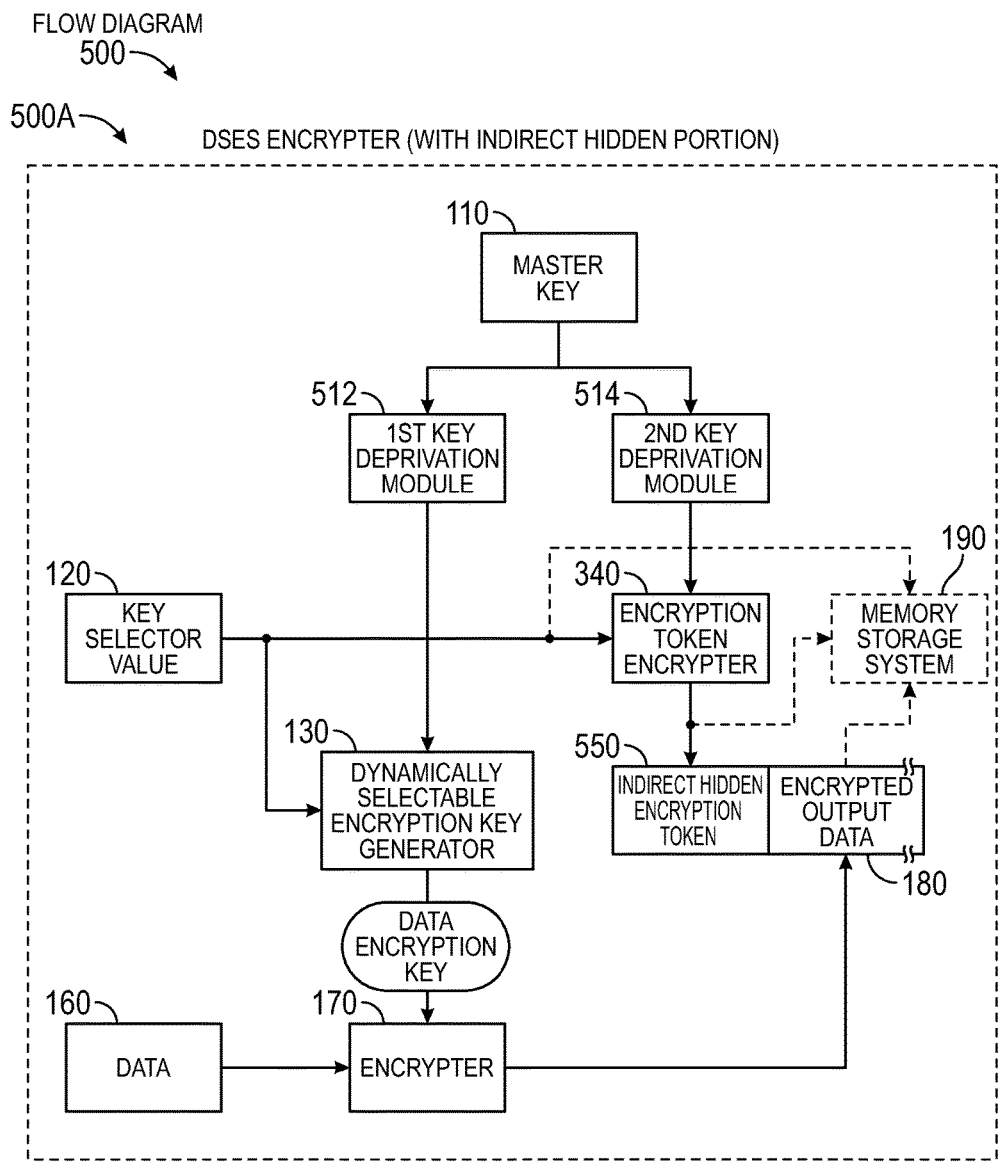
FIG. 5 is a flow diagram that describes the Dynamically Selectable Encryption System (DSES) with and Indirect Hidden Portion

FIG. 5 is a flow diagram (500) for operation of the Dynamically Selectable Encryption System (DSES) Encrypter (500A) with an Indirect Hidden Portion. The master key (110), in this configuration, is the source for a first key derivation communication processor (512) and second key derivation communication processor (514). These key derivation communication processors (512, 514) utilize information from the master key (110) to provide variants of the original master key (110). The first key and second key derivation communication processors (512, 514) are distinguishable from each other in that they use unique initialization vectors and/or algorithms to each produce uniquely different derived keys. The master key (110) is provided to the first key derivation communication processor (512) that is used by a dynamically selectable encryption key generator (130) together with the key selector value (120) to produce a data encryption key (KE) in a dynamic fashion. The key (KE) maybe changed at any time based upon a change in the key selector value (120). In addition the same master key (110) is provided to the second key derivation communication processor (514). The key selector value (120) is sent to a decryption token encrypter (340) along with the second key derivation communication processor (514). The decryption token encrypter (340) encrypts the key selector value (120) and produces an indirect hidden encryption token (550). Encrypter (170) receives data (160) which may be in the form of plaintext and encrypts the data according to the value of the key (KE). Encrypted output data (180) is accepted from encrypter (170) which may be provided in the form of cyphertext. The combination of the indirect hidden encryption token (550) and the encrypted output data (180) now becomes available as encrypted communication signals.

The encryption process described above is for dynamically encrypted data on the move. For dynamically encrypted data at rest, shown as an optional feature by using dashed lines, the key selector value (120) or the indirect hidden encryption token (550) is utilized by a memory storage system (190) as the block address to store the encrypted output data (180) at that specific block address. In this manner every block of memory in the memory storage system is encrypted with a unique encryption key (KE).

Figure 6:
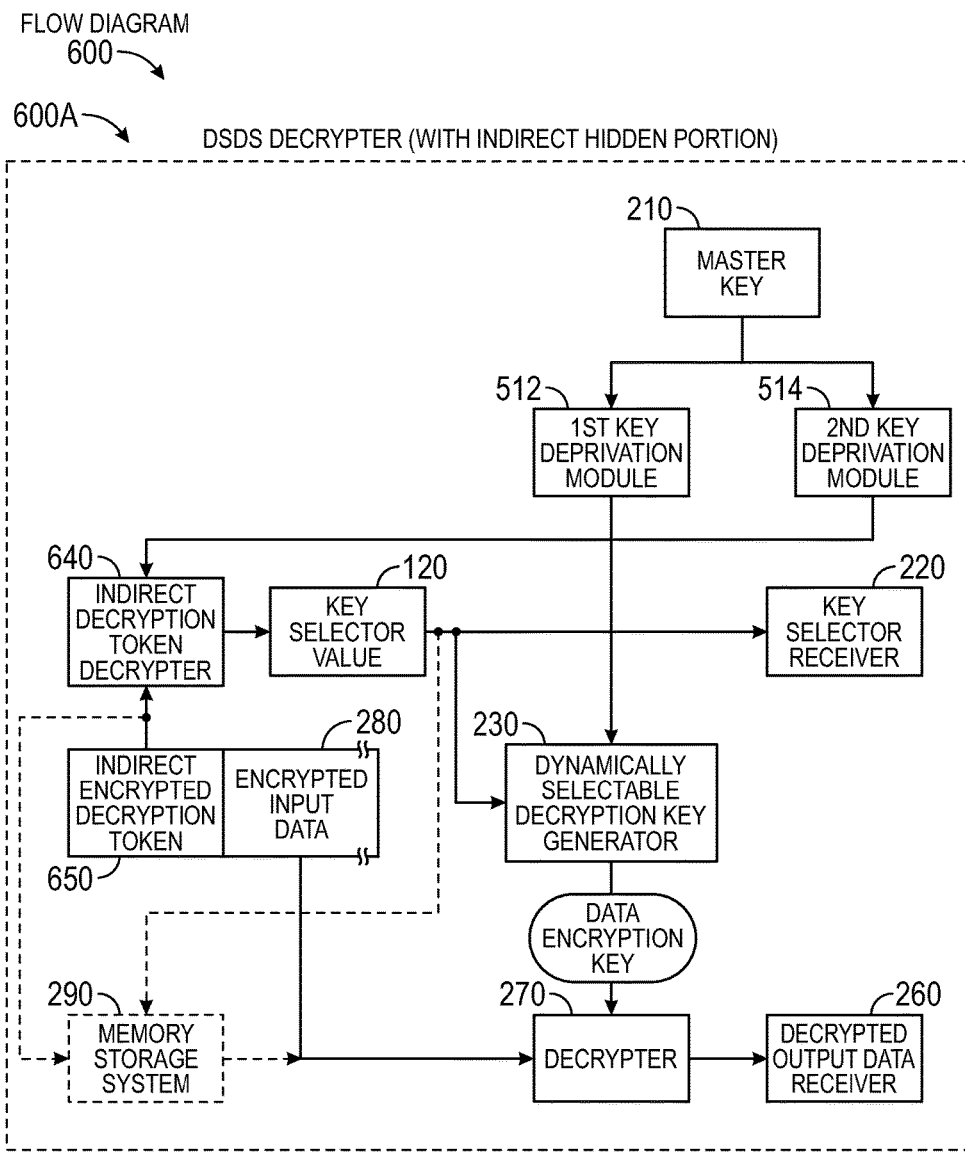
FIG. 6 is a flow diagram that describes the Dynamically Selectable Decryption System (DSDS) with and Indirect Hidden Portion

FIG. 6 is a flow diagram (600) for operation of the Dynamically Selectable Decryption System (DSDS) Decrypter (600A) with an Indirect Hidden Portion. The master key (210) has the same value as its matching master key (110) for the DSES as described in FIG. 1. The master key (210), in this configuration, is the source for a first key derivation communication processor (512) and second key derivation communication processor (514). These key derivation communication processors (512, 514) utilize information from the master key (210) to provide variants of the original master key (210). As in FIG. 5, the first key and second key derivation communication processors (512, 514) are distinguishable from each other in that they use unique initialization vectors and/or algorithms to each produce uniquely different derived keys.

The combination of the indirect hidden encryption token (550) and the encrypted output data (180) which has become available as communication signals (see FIG. 5) are received as an indirect encrypted decryption token (650) and as encrypted input data (280).

The master key (210) is provided to the second key derivation communication processor (514). The indirect encrypted decryption token (650) is sent to an indirect decryption token decrypter (640) along with the second derivation communication processor (514). The indirect decryption token decrypter (640) decrypts the indirect encrypted decryption token (650) and produces the key selector value (120).

The master key (210) is provided to the first key derivation communication processor (512) that is used by a dynamically selectable decryption key generator (230) together with the key selector value (120) to produce a decryption key (KD) in a dynamic fashion. The key (KD) maybe changed at any time based upon a change in the key selector value (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted data on the move. For dynamically decrypted data at rest, shown as an optional feature by using dashed lines, the key selector value (120) or the indirect encrypted decryption token (650) is utilized by a memory storage system (290) as the block address to recover the encrypted output data (280) at that specific block address. In this manner every block of memory in the memory storage system is encrypted and decrypted with a unique encryption key (KE).

Figure 7:
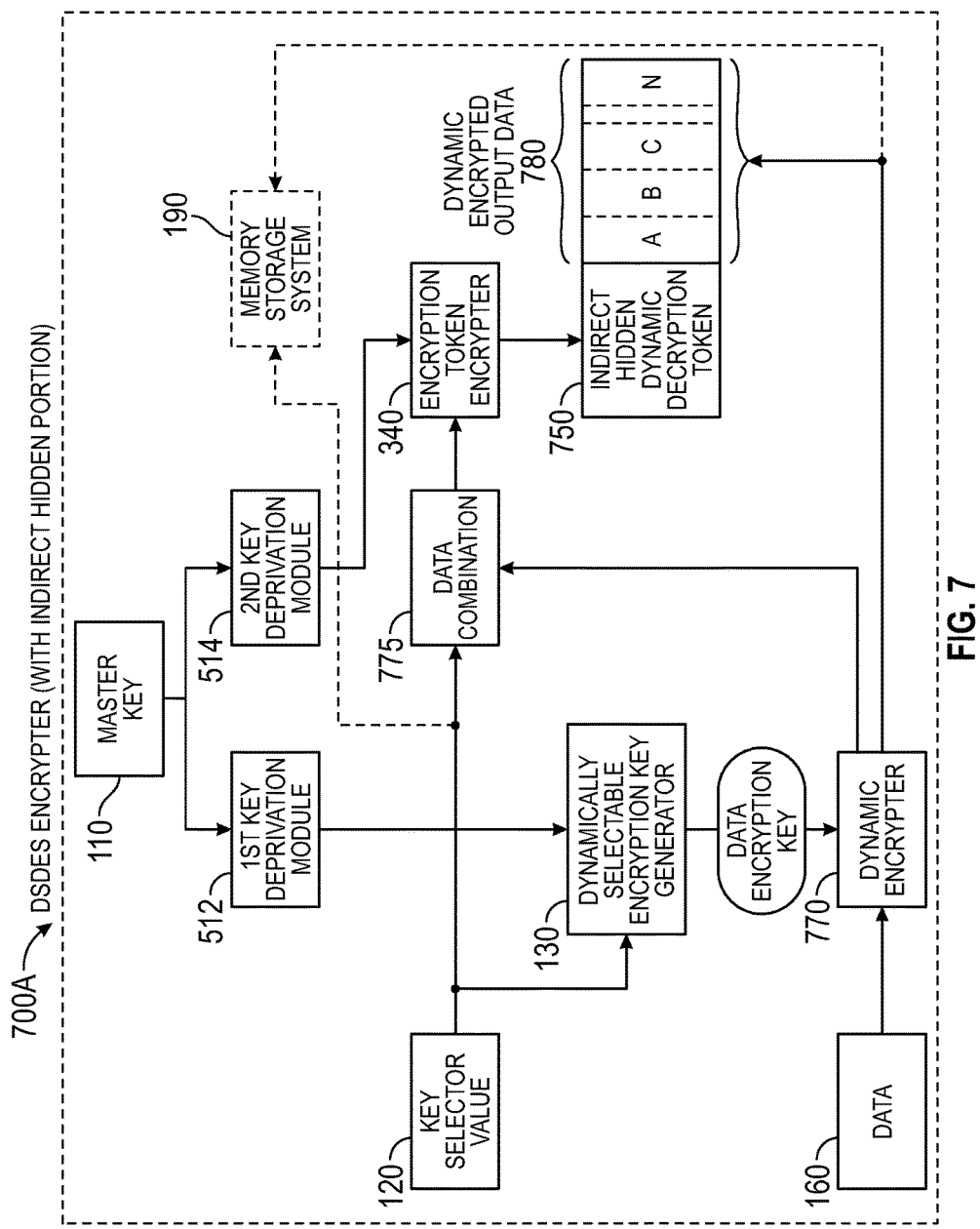
FIG. 7 is a flow diagram that provides one example of a detailed End-to-End Hidden Encryption System Utilizing a Sophisticated Dynamic Encrypter

FIG. 7 is a flow diagram (700) for operation of the Dynamically Selectable Dynamic Encryption System (DSDES) Encrypter (700A) with an Indirect Hidden Portion. The master key (110), in this configuration, is the source for a first key derivation communication processor (512) and second key derivation communication processor (514). These key derivation communication processors (512, 514) utilize information from the master key (110) to provide variants of the original master key (110). The first key and second key derivation communication processors (512, 514) are distinguishable from each other in that they use unique initialization vectors and/or algorithms to each produce uniquely different derived keys. The master key (110) is provided to the first key derivation communication processor (512) that is used by a dynamically selectable encryption key generator (130) together with the key selector value (120) to produce a data encryption key (KE) in a dynamic fashion. The key (KE) maybe changed at any time based upon a change in the key selector value (120). In addition the same master key (110) is provided to the second key derivation communication processor (514). The key selector value (120) is sent to a data combiner (775) along with control data from the dynamic encrypter (770) that includes descriptive information about the nature of dynamic encrypted output data (780) such as length, padding, and encryption parameters. The decryption token encrypter (340) encrypts the combined data from the data combiner (775) and produces an indirect hidden dynamic decryption token (750). Dynamic encrypter (770) receives data (160) which may be in the form of plaintext and encrypts the data according to the value of the key (KE). The dynamic encrypter functions to provide new encryption keys for every block of encrypted data of some length along with padding to further adjust the data (string) length as required. The length, padding, and encryption parameters are available for proper decryption and supplied to the data combiner (775). Dynamic encrypted output data (780) is accepted from dynamic encrypter (770) which may be provided in the form of cyphertext. The combination of the indirect hidden dynamic decryption token (750) and the dynamic encrypted output data (780) now becomes available as dynamic encrypted communication signals.

The dynamic encryption process described above is for dynamically encrypted data on the move. For dynamically encrypted data at rest, shown as an optional feature by using dashed lines, the key selector value (120) is utilized by a memory storage system (190) as the block address to store the dynamic encrypted output data (780) at that specific block address. In this manner every block of memory in the memory storage system is encrypted with a unique encryption key (KE). In the case of storing dynamically encrypted data at rest, fixed data block sizes are used that obviates the need for including control data from the dynamic encrypter (770) for completing decryption.

Figure 8:
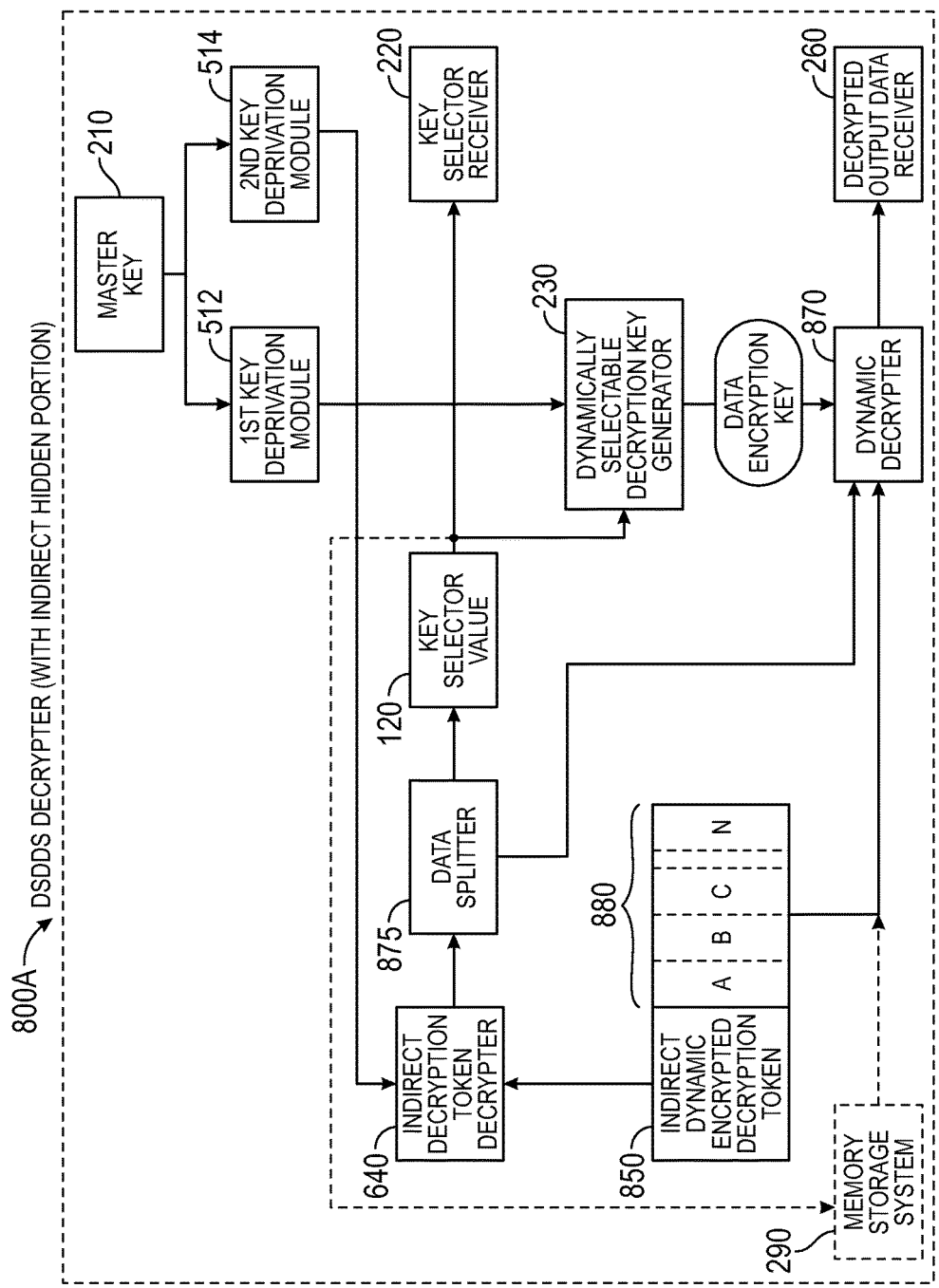
FIG. 8 is a flow diagram that provides one example of a detailed End-to-End Hidden Encryption System Utilizing a Sophisticated Dynamic Decrypter

FIG. 8 is a flow diagram (800) for operation of the Dynamically Selectable Dynamic Decryption System (DSDDS) Decrypter (800A) with an Indirect Hidden Portion. The master key (210) has the same value as its matching master key (110) for the DSES as described in FIG. 1. The master key (210), in this configuration, is the source for a first key derivation communication processor (512) and second key derivation communication processor (514). These key derivation communication processors (512, 514) utilize information from the master key (110) to provide variants of the original master key (210). As in FIG. 5, the first key and second key derivation communication processors (512, 514) are distinguishable from each other in that they use unique initialization vectors and/or algorithms to each produce uniquely different derived keys.

The combination of the indirect hidden dynamic decryption token (750) and the dynamic encrypted output data (780) which has become available as communication signals (see FIG. 7) are received as an indirect dynamic encrypted decryption token (850) and as dynamic encrypted input data (880).

The master key (210) is provided to the second key derivation communication processor (514). The indirect encrypted dynamic decryption token (850) is sent to an indirect decryption token decrypter (640) along with the second derivation communication processor (514).

The indirect decryption token decrypter (640) decrypts the indirect dynamic encrypted decryption token (850) and sends it to the data splitter (875). The data splitter (875) separates the key selector value (120) from the control data which is sent to dynamic decrypter (870). The control data contains information such as length, padding, and decryption parameters.

The master key (210) is provided to the first key derivation communication processor (512) that is used by a dynamically selectable decryption key generator (230) together with the key selector value (120) to produce a decryption key (KD) in a dynamic fashion. The key (KD) maybe changed at any time based upon a change in the key selector value (120). The key selector value (120) is sent to the key selector receiver (220).

Dynamic decrypter (870) receives encrypted dynamic input data (880) which may be in the form of cyphertext and decrypts the data according to the value of the decryption key (KD). The dynamic decrypter (870) functions to provide new decryption keys for every block of decrypted data along with padding as required. The length, padding, and encryption parameters are available for proper decryption and supplied by the data splitter (875). Decrypted output data receiver (260) from dynamic decrypter (870) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted dynamic data on the move. For dynamically decrypted data at rest, shown as an optional feature by using dashed lines, the key selector value (120) is utilized by a memory storage system (290) as the block address to recover the encrypted dynamic output data (880) at that specific block address. In this manner every block of memory in the memory storage system is encrypted and decrypted with a unique decryption key (KD). In the case of storing dynamically encrypted data at rest, fixed data block sizes are used that obviates the need for including control data from the dynamic decrypter (870) for completing decryption.

Figure 9:
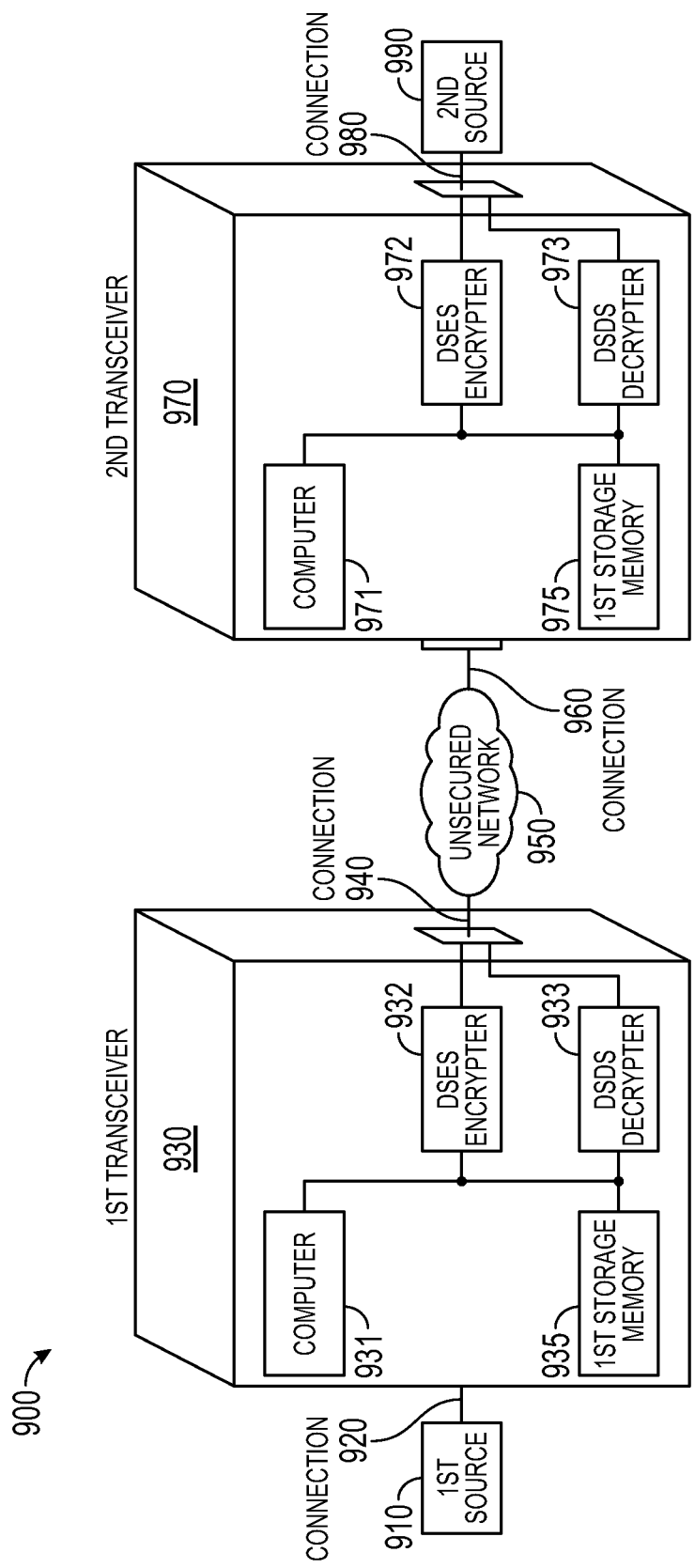
FIG. 9 is a schematic that provides at least one embodiment that illustrates the combination of two transceiver devices utilizing both encrypters and decrypters.

FIG. 9 is a schematic (900) depicting the combination of two transceiver devices utilizing both encrypters and decrypters with memory. Communication signals from a first source (910) are sent through connection (920) to the first transceiver (930). The first transceiver (930) securely connects encrypted data through connection (940) through unsecured network (950). The second transceiver (970) securely connects encrypted data through another connection (960) through unsecured network (950). Communication signals from a second source (990) are sent through connection (980) to the second transceiver (970).

In order to secure communication signals from the first source (910) to the second source (990), the following process is required. The signals (910) enter the first transceiver (930) through connection (920) and travel to the (DSES) Encrypter (932). The (DSES) Encrypter (932) is controlled by the computer (931) to dynamically encrypt and transmit the communication signals to the DSDS Decrypter (973) via an unsecured network (950). Encrypted signals arrive at the second transceiver (970) to the DSDS Decrypter (973) controlled by computer (971). DSDS Decrypter (973) decrypts the signals and sends them to the second source (990) thorough connection (980). This accomplishes sending secured signals from a first source (910) to a second source (990) by utilizing the dynamic encryption system of the present disclosure. The communication signals can be conversely secured by sending them from the second source (990) to the first source (910) utilizing the DSES Encrypter (972) in the second transceiver (970) as well as the DSDS Decrypter (933) in the first transceiver (930). This completes the process for securing data in transit.

For data at rest for memory stored in storage devices, in order to securely store, seal and recover communication signals from the first source (910), the process described below is required. The first source (910) provides signals that enter the first transceiver (930) through the connection (920) and travel to the (DSES) Encrypter (932). The (DSES) Encrypter (932) is controlled by the computer (931) to dynamically encrypt, store and seal the communication signals to a first storage memory (935). To recover sealed storage signals from the first storage memory (935), the computer (931) removes dynamically encrypted communication signals from the first storage memory (935) and delivers the signals to the DSDS decrypter (933) which dynamically decrypts the signals allowing the unencrypted signals to flow back to the first source (910) through connection (920). The same process as described regarding data at rest is followed within the second transceiver (970) and second source (990).

Figure 10:
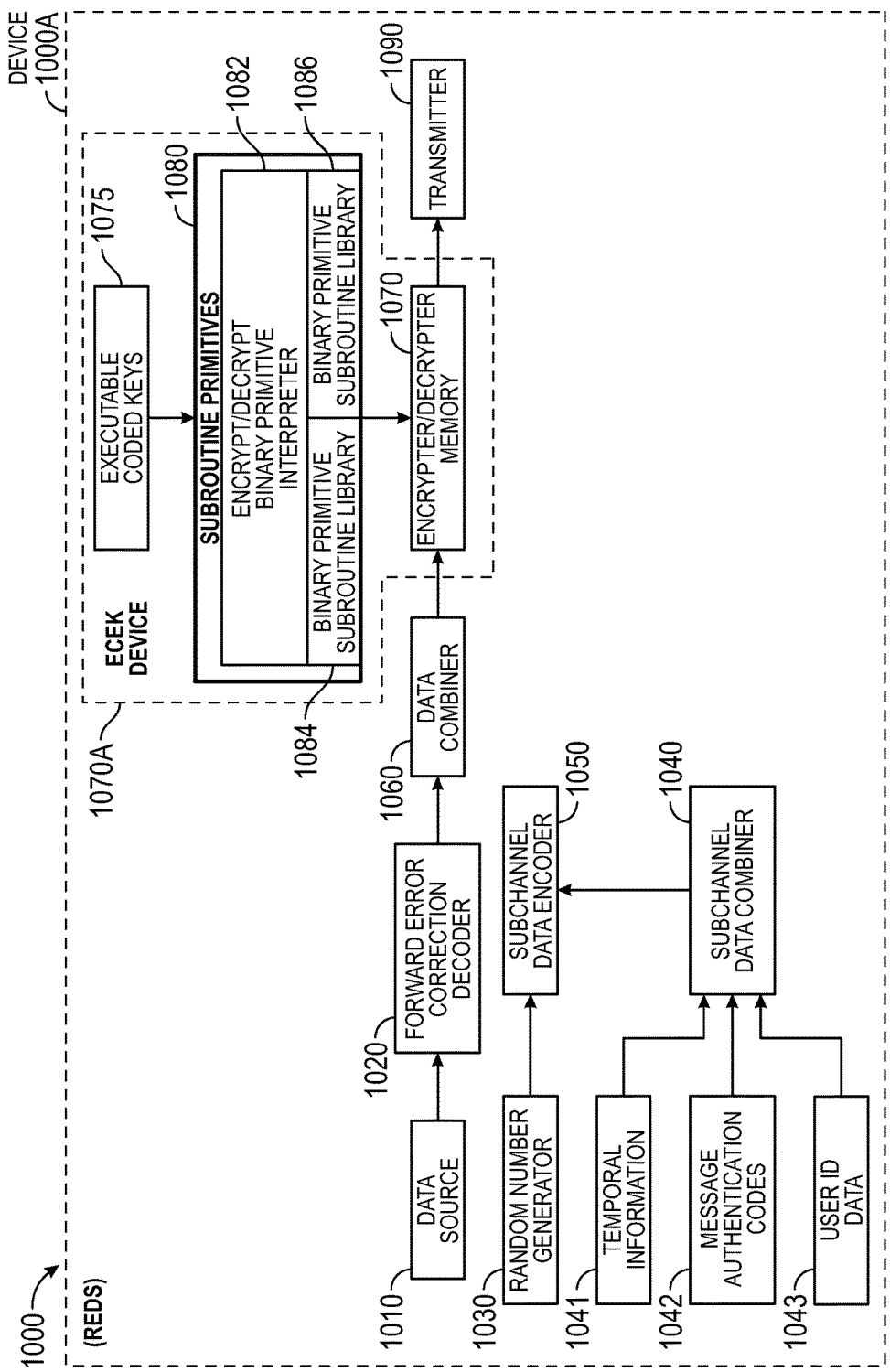
FIG. 10 is a flowchart describing a device that communicates randomized encrypted data with sub-channels (REDS) together with executable coded encryption key (ECEK) device that encrypts and/or decrypts data using executable coded keys (1075), which is a REDS/ECEK device. This REDS/ECEK device transmits randomized encrypted data with data sub-channels and with executable coded encryption keys.

FIG. 10 is a flowchart (1000) describing a device (1000A) that communicates randomized encrypted data with sub-channels (REDS) together with executable coded encryption key (ECEK) device that encrypts and/or decrypts data using executable coded keys (1075), which is a REDS/ECEK device. This REDS/ECEK device transmits randomized encrypted data with data sub-channels and with executable coded encryption keys. Beginning with a data source (1010) which could be plaintext, the data is sent to forward error correction encoder (1020) which encodes the data and provides a known degree of forward error correction to the data. This function enlarges the transmitted data by adding various error checking features that may include rows, columns, and diagonal checksums. The forward error corrected data is sent to the data combiner (1060). A random number generator (1030) provides a random number for a sub-channel data encoder (1050). Sub-channel data combiner (1040) which is comprised of inputs from temporal information (1041), message authentication codes (1042) and user data—such as user ID data (1043), is sent to the sub-channel data encoder (1050). At this point, the sub-channel data encoder (1050) has received the required or desired input for the data sub-channels. The sub-channel data encoder (1050) now encodes the sub-channel data and sends it to the data combiner (1060). The data combiner (1060) combines the forward error corrected data with the sub-channel data. This combined data is sent to the executable coded encryption key device, an ECEK device, (1070 A), and into the encrypter/decrypter memory (1070) which stores the data while it is being encrypted and/or decrypted. The ECEK device (1070A) encrypts data using executable coded keys (1075). When the encryption/decryption is completed the data is sent to a transmitter (1090). The process of encryption/decryption is controlled by the executable coded keys (1075). The executable coded keys (1075) need only remain in computer memory for at least the duration of the encryption/decryption process. Executable coded keys (1075) control the execution of encryption/decryption subroutine primitives (1080). The subroutine primitives (1080) read, modify, and write the encrypter/decrypter memory (1070). This allows for the executable coded keys (1075) to control the encryption/decryption process of reading, modifying, and writing the encrypter/decrypter memory (1070) by utilizing the subroutine primitives (1080). This allows for the executable coded keys (1075) to be removed from a computer memory (not shown), as computer memory no longer contains instructions to encrypt and/or decrypt the data residing in the encrypter/decrypter memory (1070). As a result, it is impossible to reverse compile the code because the code no longer resides in computer memory. In addition, it is impossible to steal or copy the coded keys (1075) because they also no longer reside in computer memory. In the present disclosure, the encryption/decryption instructions reside in the key itself, for which no source code exists, i.e., there is no source code for the key.

The executable coded keys (1075) simply contain the typical binary randomized bits that are the same or similar to those contained in today's symmetric encryption keys. These bits may be interpreted by the encrypt/decrypt binary primitive interpreter (1082) which then dispatches control to the balance of the binary primitive subroutine libraries (1084, 1086). The binary primitive subroutine libraries (1084, 1086) are chosen functions which provide instructions to encrypt or decrypt the data in encrypt/decrypt memory (1070). While encrypting, the encryption set of primitives (1084) are utilized by bits in executable coded keys (1075) to produce encryption functions. While decrypting, a decryption set of primitives (1086), utilizes the same bits found in the executable coded keys (1075) which provide matching but inverse functions that are required to decrypt the data. For decryption, the bits used from the executable coded keys (1075) are utilized in a reverse order when compared with those utilized during and for encryption.

At this point data source (1010) has been combined with sub-channel data (1050) which includes randomness so that a fully randomized and encrypted data output has been realized and transmitted through transmitter (1090).

Figure 11:
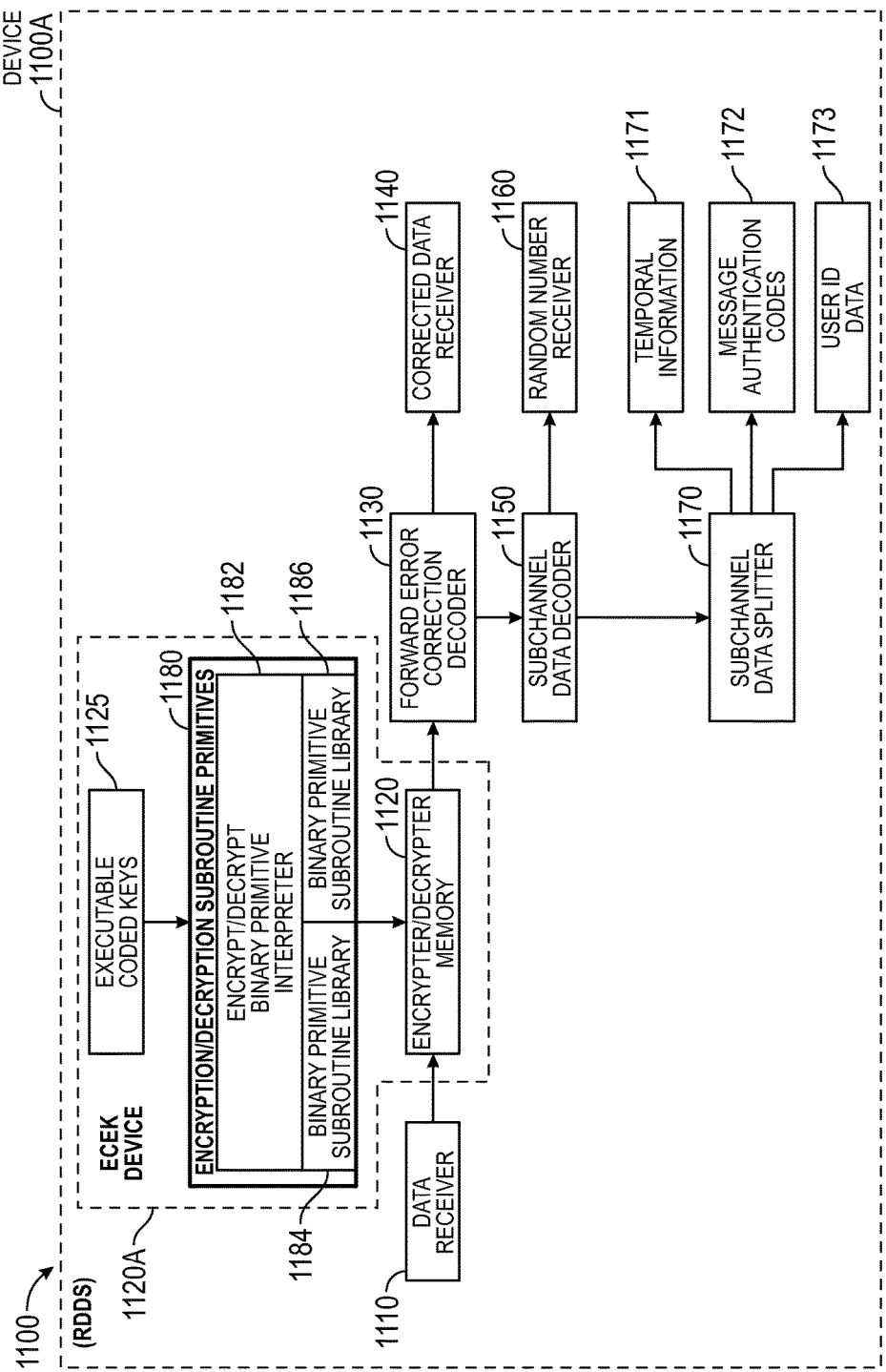
FIG. 11 is a flowchart describing a device that communicates randomized decrypted data with sub-channels (RDDS) that receives randomized encrypted data with data sub-channels together with a device that uses an executable coded decryption key, (ECDK) devices that decrypts data using executable coded keys (1125). This combined device is a RDDS/ECDK device. The RDDS/ECDK device transmits randomized encrypted data with data sub-channels and with executable coded encryption keys.

FIG. 11 is a flowchart (1100) describing a device (1100A) that communicates randomized decrypted data with sub-channels (RDDS) that receives randomized encrypted data with data sub-channels together with a device that uses an executable coded decryption key, (ECDK) devices that decrypts data using executable coded keys (1125). This combined device is a RDDS/ECDK device. The RDDS/ECDK device transmits randomized encrypted data with data sub-channels and with executable coded encryption keys.

Beginning with data receiver (1110) which could be cypher-text data is sent to the executable coded encryption key device, an ECEK device, (1120A), and into the encrypter/decrypter memory (1120) which stores the data while it is being encrypted and/or decrypted. The ECEK device (1120A) encrypts data using executable coded keys (1125). When the encryption/decryption is completed the data is sent to a transmitter (1130). The process of encryption/decryption is controlled by the executable coded keys (1125). The executable coded keys (1125) need only remain in computer memory for at least the duration of the encryption/decryption process. Executable coded keys (1125) control the execution of encryption/decryption subroutine primitives (1180). The subroutine primitives (1180) read, modify, and write the encrypter/decrypter memory (1120). This allows for the executable coded keys (1125) to control the encryption/decryption process of reading, modifying, and writing the encrypter/decrypter memory (1120) by utilizing the subroutine primitives (1180). This allows for the executable coded keys (1125) to be removed from a computer memory (not shown), as computer memory no longer contains instructions to encrypt and/or decrypt the data residing in the encrypter/decrypter memory (1120). As a result, it is impossible to reverse compile the code because the code no longer resides in computer memory. In addition, it is impossible to steal or copy the coded keys (1125) because they also no longer reside in computer memory. In the present disclosure, the encryption/decryption instructions reside in the key itself, for which no source code exists, i.e., there is no source code for the key.

The executable coded keys (1125) simply contain the typical binary randomized bits that are the same or similar to those contained in today's symmetric encryption keys. These bits may be interpreted by the encrypt/decrypt binary primitive interpreter (1182) which then dispatches control to the balance of the binary primitive subroutine libraries (1184, 1186). The binary primitive subroutine libraries (1184, 1186) are chosen functions which provide instructions to encrypt or decrypt the data in encrypt/decrypt memory (1120). While encrypting, the encryption set of primitives (1184) are utilized by bits in executable coded keys (1125) to produce encryption functions. While decrypting, a decryption set of primitives (1186), utilizes the same bits found in the executable coded keys (1125) which provide matching but inverse functions that are required to decrypt the data. For decryption, the bits used from the executable coded keys (1125) are utilized in a reverse order when compared with those utilized during and for encryption.

The encrypter/decrypter memory (1120) now possesses the decrypted data and allows the decrypted data to be sent to the forward error correction decoder (1130). The forward error correction decoder (1130) provides two data outputs. The first output is the forward error corrected data which is sent to the corrected data receiver (1140). As before, the data could be in plain text form. The second output is the forward error correction decoder (1130) sends the decrypted data to a sub-channel data decoder (1150). The sub-channel data decoder (1150) decodes the sub-channel data, sending the received random number to the random number receiver (1160) and the sub-channel data to the sub-channel data splitter (1170). Sub-channel data splitter (1170) splits the sub-channel data into sub-channel data receivers (1171, 1172, and 1173) which correspond to temporal information (1171), message authentication codes (1172) and user data—such as user ID data (1173).

At this point, the data received from the data receiver (1110) has been split into both the corrected data receiver (1140) as well as the sub-channel data receivers (1171, 1172, and 1173) and the random number receiver (1160). After the operation described in FIG. 10 has evolved, the initial point source data (1010), the random number generator (1030), and the sub-channel data (1041, 1042, 1043) has now been fully de-randomized, decrypted, and recovered into the corrected data receiver (1140) as well as both the random number receiver (1160) and the sub-channel data receivers (1171, 1172, and 1173).

Figure 11A:
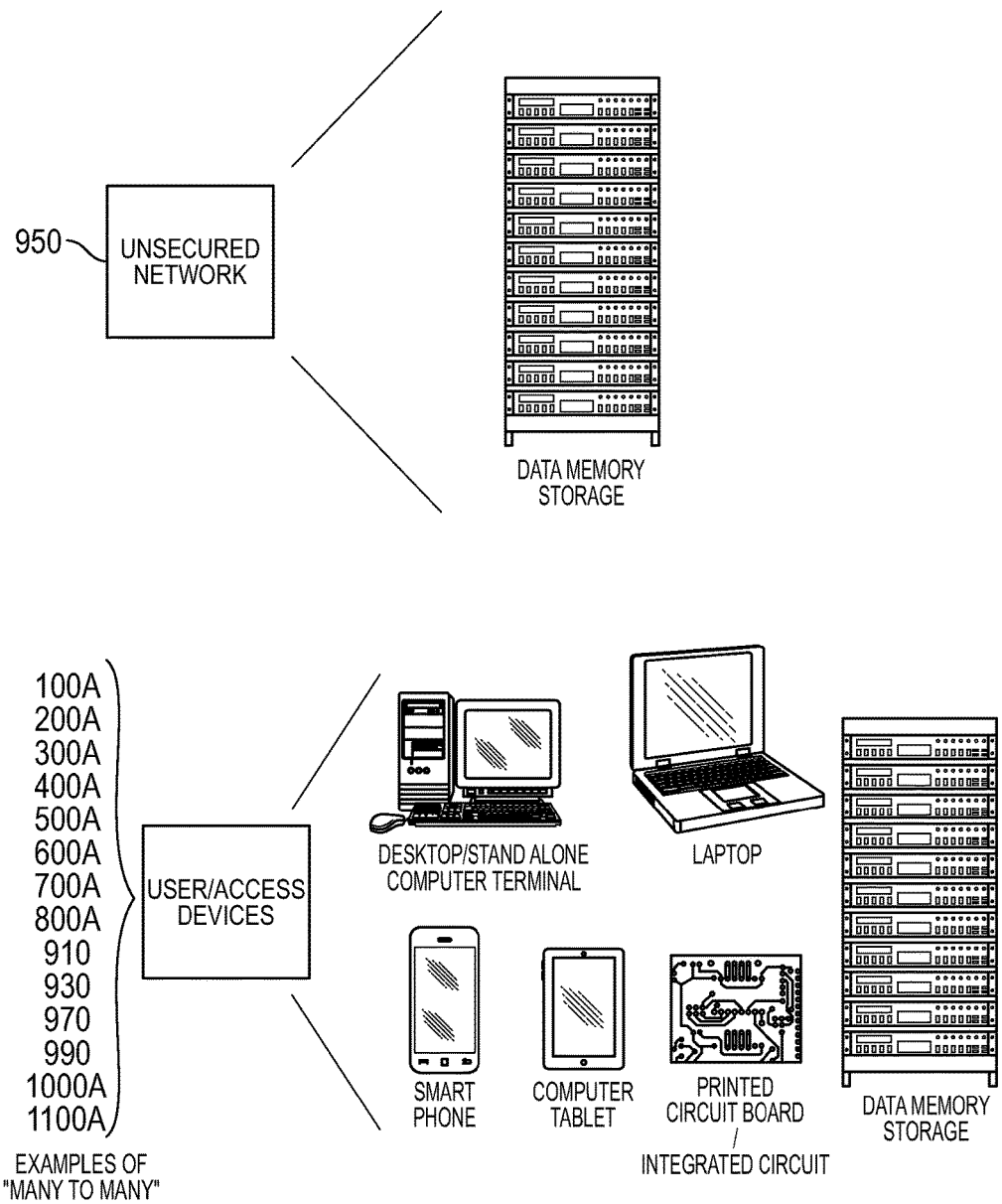
FIG. 11A is a schematic diagram that illustrates devices utilized initially represented in simple block form for FIGS. 1, 2, 3, 4, 5, 6, 7, 8, 9, 10, and 11 (1-11).

FIG. 11A is a schematic diagram that illustrates devices utilized initially represented in simple block form for FIGS. 1,2,3,4,5,6,7,8, 9, 10, and 11. More specifically, FIG. 11A further illustrates and demonstrates actual and various devices using exploded view callouts from that depicted in the schematic diagram shown in FIG. 11A and described above (in e.g. FIGS. 1-11). The list of devices associated with callouts 100A, 200A, 300A, 400A, 500A, 600A, 700A, 800A, 910, 930, 970, and 990, 1000A and 1100A (in FIGS. 1-11) can represent DASA database(s) as well as user devices and/or access devices including desktop or stand-alone computer terminals replete with hard drives, laptop computers, cellular or smart telephones, computer tablets such as the iPad® and even printed circuit boards or integrated circuits (ICs). Further, elaborating on the virtual user devices as described above, these can be created and are shown as real output device(s). It remains important to understand that these real devices can be used to create virtual user devices.

As stated above, further examples of "many to many" connections are also included herein as communication data connections with the list of 100A, 200A, 300A, 400A, 500A, 600A, 700A, 800A, 910, 930, 970, and 990, 1000A, and 1100A devices. Data communication amplifiers, repeaters, and/or range extenders which optionally assist in ensuring signal integrity and strength, over various communication distances can be located in the data communication flow paths connecting the DASA databases, user devices, and/or access devices.

Figure 12:
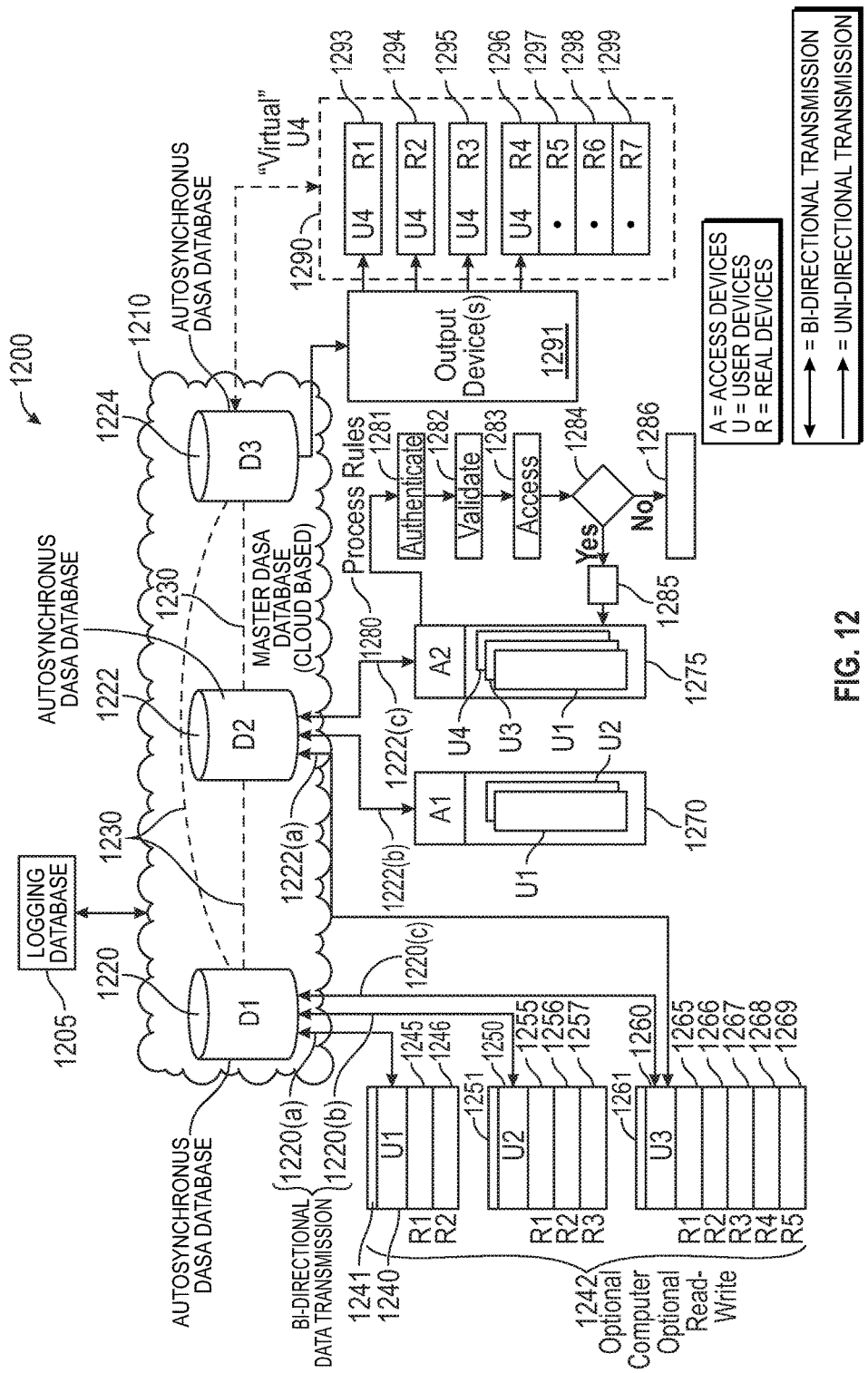
FIG. 12 is a schematic which provides at least one embodiment of the computer enabled access control (securitization) system, which contains, in this instance, a real or virtual master distributed auto-synchronous array (DASA) database.

Specifically, FIG. 12 is a schematic which provides at least one embodiment of the computer enabled access control (securitization) system (1200), which contains, in this instance, a real or virtual master distributed auto-synchronous array (DASA) database (1210), depicted as a cloud, that at least stores and retrieves data and that includes at least two or more partial distributed auto-synchronous array (DASA) databases D1, D2, D3, shown as (1220, 1222, and 1224) so that the partial DASA databases 1220(D1), 1222 (D2), and 1224(D3)) are capable of functioning in an independent and/or collaborative manner (1230), and such that the master DASA database (1210) and partial DASA databases (1220, 1222, and 1224) allow for bi-directional transmission of data, shown as (1220a), (1220b), and (1220c) for 1220 (D1) as well as for 1222 (D2) with transmissions (1222a), (1222b), and (1222c). Simply for the purposes of illustration, these transmissions are shown to be different than the transmissions shown to exist for (1224), D3 as will be further explained below. It should be noted that the D3 transmissions can be identical to those of D1 and/or D2 and that multiple databases D1 . . . Dn can exist.

The multiple partial user devices U1, U2, U3 are shown as (1240), (1250), and (1260) respectfully. The multiple partial user devices in this instance include 2 sets of records in U1(1240); U1R1(1245) and U2R2 (1246), 3 set of records in U2(1250), U2R1(1255), U2R2(1256), and U2R3 (1257), and 5 sets of records in U3 (1260); U3R1(1265), U3R2 (1266), U3R3(1267), U3R4 (1268), and U3R5 (1269). Each of these user devices contains optional computing capabilities (1241, 1251, and 1261) that also provide for overall optional read/write functionality (1242). Multiple partial access devices (A1-1270 and A2-1275) exist that can store and provide at least partial copies, U1 (1240) with a set of records U1R1 and U1R2-(1245, 1246), U2 (1250), with sets of records U2R1(1255), U2R2(1256), and U2R3, (1257). Access device A2 (1275), in this case possesses 3 sets of records, U1 (1240), with records U1R1, (1245) and U1R2, (1246), U3, (1260), with 5 sets of records U3R1 through U3R5; (1265-12269) and U4 (1290), which is a virtual user device, that in this instance contains 7 records, U4R1 through R7 that are represented as U4R1(1293), U4R2 (1294), U4R3(1295), U4R4(1296), U4R5(1297), U4R6 (1298), and U4R7(1299). The virtual user device, U4 (1290) is created by output device(s) (1291) e.g. printers, scanners, tokens, stamps, RFID tags, encoders, wave scanners, electromagnetic devices, etc. which subsequently create virtual user devices (U4). In other cases, it is possible that these user devices could be a collection of both real and virtual user devices that also can be connected to a partial database D3 (1224).

In this case, virtual U4 (1290), U4R1 (1293) is a printed bar code ticket that could be provided in a paper or electronic format. U4R2 (1294) is a QR code printed on a more durable plastic medium or electronic format. U4R3 (1295) is an electronic record sent to a user's personal smart display device (e.g. an application on a cell phone) which displays a QR code on its screen. U4R5-U4R7 (1296-1299), in this case are RFID tags that provide for bi-directional nearfield communications. Each of these records within the virtual U4 device (1290) are produced by appropriate output devices (1291) for each media type. In the case of U4R3(1295) which is for a "smart" or intelligent application and for U4R4-U4R7 (1296-1299) which is a read-write device, these records can be distinguished from a single photographic copy so that only the designated users/user devices can possess the authentic and validated records. The read-write capability allows for verification of the actual token, which is not possible for records U4R1 (1293) and U4R2 (1294), which are simple images. The simple images must still be used in sequence, in a single instance, unless tolerance rules provide otherwise.

Here the master DASA database (1210) and/or partial DASA databases (1220, 1222, and 1224) are linked and communicate with one or more logging and monitoring database(s) (1205) capable of statistical and numerical calculations utilizing or otherwise involving the data. An alarm function can also be implemented with or without the assistance of temporal devices (such as clocks and other timepieces).

FIG. 12 also provides, as an example, a set of process rules which are carried out directly or indirectly as computer operations (1280) that are followed to authenticate (1281), validate (1282) and determine access (1283) for user devices. These rules apply to all access devices, including access devices, A1 (1270) and A2 (1275). There can be, and often are, different rules that should be followed for other access devices. The flow path provided indicates that the access device(s) authenticates (1281) using a first set of rules, validates (1282) using a second set of rules, and includes a third set of rules that controls access (1283) using data that has been supplied by the user devices to ensure access to only a specified set of users under specified conditions.

The process rules are finalized with an access decision (1284) which includes at least two options. One option is an access decision (1285) that includes the process of allowing user access and verifies the user has invoked their privileges. This may include, for example, physical access such as opening doors or logical access such as unlocking data within databases or communication systems. Normally the user would be alerted to the system when allowing access. The user's activity then may be monitored by the access process to ensure that they have utilized their access within certain limitations. Physical limitations may be provided by enabling door monitoring switches, floor-mats, man traps, video analysis, etc. Logical limitations may be monitored by keyboard and/or data access and the like. Temporal limitations may be employed as required. Access may further be limited by counting the number of access/egress attempts. In the case of access denial (1286), the user will be normally notified of the denial of access and optional alarming may take place. Reporting of the activity is normally returned from the access device(s) (e.g. 1270, 1275) to the master DASA database (1210), which also provides for logging the data, meta-data and associated information to the external logging and monitoring database (105).

Figure 12A:
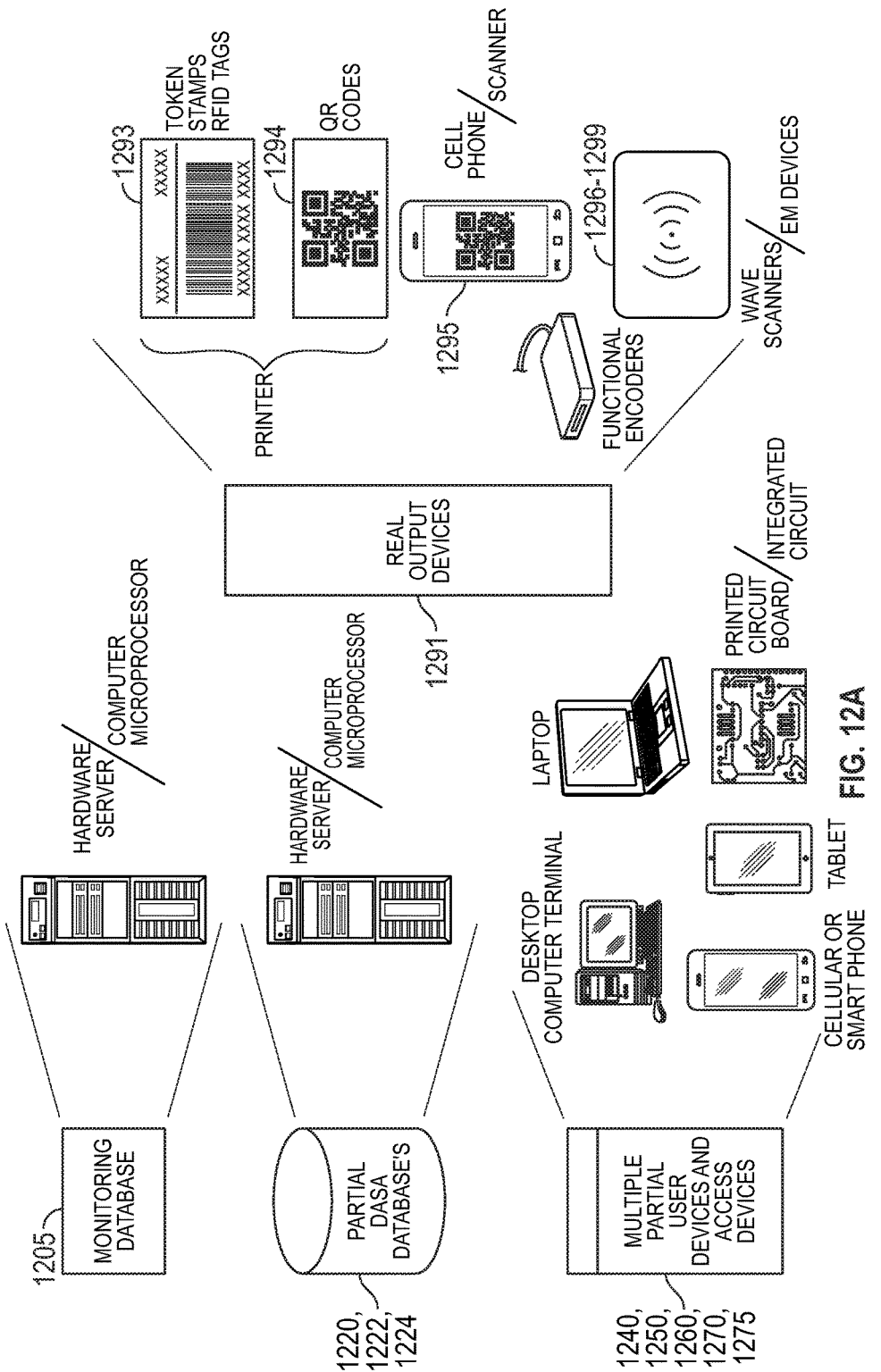
FIG. 12A is a schematic diagram that illustrates devices utilized initially represented in simple block form for FIG. 12. So that the above recited features and advantages of the present disclosure can be understood in detail, a more particular description of the invention and reference to embodiments are provided and illustrated in the appended figures. It is to be noted, however, that the appended drawings illustrate only typical embodiments of the present

FIG. 12A further illustrates and demonstrates actual and various devices using exploded view callouts from that depicted in the schematic diagram shown in FIG. 12 and described above. Specifically, (1205), the monitoring database, is shown as linked, residing within, and/or processed by a server or other computer microprocessor(s). In addition, the DASA database (1210) and/or partial DASA databases (1220, 1222, and 1224) are linked and communicate with the same or different (in some cases hardware) server(s) or other computer microprocessor(s). In addition, the multiple partial user devices U1, U2, U3 shown as (1240), (1250), and (1260) respectfully, as well as the multiple partial access devices, (1270), (1275) are shown as one or more of several hardware devices including a desktop computer terminal and hard drive, a laptop computer, a cellular or smart phone, a tablet, such as an iPad®, and even a printed circuit board or integrated circuit (IC).

Further, elaborating on the virtual user device, U4 (1290) as described above, can be created and are shown as real output device(s) (1291) e.g. printers, scanners, tokens, stamps, RFID tags, (1293,1294) existing on or in cell phones or scanners (1295) and/or functioning encoders, wave scanners, and/or electromagnetic devices (1296-1299). It is important to understand that these real devices can be used to create virtual user devices (U4)—as shown in FIG. 12.

The availability of such a system allows for stronger security regarding the degree of confidentiality with more confidence. Employing this system further establishes the goal to help encryption systems develop a larger acceptance reputation. Such acceptance provides a consequent increase in usage and a worldwide strengthening of data communications, electronic mail, and commercial electronic transactions.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the later being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more combined devices that encrypt data transmitted to or decrypt data received from or both transmit said data to and decrypt said data received from said one or more combined devices that utilize one or more master keys comprising:

at least one encrypter or decrypter or both an encrypter and a decrypter that encrypt or decrypt or both encrypt and decrypt said data or said associated data files or both said data and said associated data files that utilize one or more master keys and one or more key selectors, wherein said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files, and wherein said key selectors and said created cipher data and said created cipher data files produce result data and result data files where said created cipher data and said created cipher data files together with said result data and said result data files are sealed to produce encrypted data and encrypted data files that are only encrypted and decrypted with one or more said master keys and one or more said key selectors, wherein said master keys are executable coded cipher keys and wherein said data or said associated data files or both said data and said associated data files are a form of transmission(s) that are signals and one or more combined devices further comprises:

a forward error correction encoder that encodes transmission(s) and provides a known degree of forward error correction to encoded transmission(s);

a sub-channel encoder;

a transmission(s) combiner that combines said encoded transmission(s) from said forward error correction encoder with transmission(s) from said sub-channel encoder;

a transmission(s) encrypter that receives combined transmission(s) from said transmission(s) combiner, wherein said transmission(s) encrypter receives one or more encrypter keys (KE) and said combined transmission(s), where said combined transmission(s) are encrypted by said transmission(s) encrypter and sent to a transmission(s) transmitter and wherein said combined transmission(s) are in a form of cipher text;

a transmission(s) receiver that receives said cypher text and sends said cypher text to a transmission(s) decrypter, where said cypher text is decrypted and wherein said one or more combined devices further comprise;

at least one executable coded cipher key(s), and at least one executable coded encryption key (ECEK) device that encrypts transmission(s) that uses executable coded cipher key(s), and at least one executable coded decryption key (ECDK) device that decrypts transmission(s) that also uses said at least one executable coded cipher key(s), where a combined device is a randomized decrypted data with sub-channels, (RDDS)/(ECDK) device that transmits randomized encrypted data with data sub-channels and with executable coded encryption keys;

at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory, and wherein said computer memory contains encrypter/decrypter memory that possesses at least one encryption space location and at least one decryption space location for said executable coded cipher key(s), where transmission(s) is sent to said encrypter/decrypter memory that stores said transmission(s) while said transmission(s) is encrypted or decrypted or both encrypted and decrypted and when encryption/decryption is completed said encrypted or decrypted or both encrypted and decrypted transmission(s) is sent to at least one transmitter where encryption/decryption of said encrypted or decrypted or both encrypted and decrypted transmission(s) is controlled and manipulated by said executable coded cipher key(s), wherein said executable coded cipher key(s) remains in said computer memory and achieves encryption/decryption completion.

2. The one or more combined devices of claim 1, wherein said key selectors are encrypted and decrypted.

3. The one or more combined devices of claim 1, wherein said executable cipher keys contain meta data.

4. The one or more combined devices of claim 1, comprising a real or virtual master distributed auto-synchronous array (DASA) database or both one or more real and one or more virtual master distributed auto-synchronous array (DASA) databases located within or external to said one or more combined devices, where said (DASA) databases at least store and retrieve data and also include at least two or more partial distributed auto-synchronous array (DASA) databases wherein said partial DASA databases function in either an independent manner, a collaborative manner or both an independent manner and a collaborative manner, and wherein said master and partial DASA databases allow for bi-directional transmission of data to and from multiple partial user devices, to and from multiple partial access devices or to and from both partial user and partial access devices, wherein said user and said access devices are computing devices and wherein one or more partial user and one or more partial access devices store and provide at least partial copies of portions of said master DASA database and wherein said master DASA database, said partial DASA databases or both said partial and said master DASA databases are linked and communicate with each other as well as inclusion of one or more logging and monitoring databases that provide statistical and numerical calculations utilizing data, wherein tools authenticate using a first set of computing operations, validate using a second set of computing operations, and wherein a third set of computing operations controls access for a specified set of users.

5. The one or more combined devices of claim 4, wherein said master and partial DASA databases analyze and provide information in a form of data and act to control one or more output devices, wherein said output devices are computing devices and wherein said one or more output devices create user devices.

6. One or more combined systems that encrypt data transmitted to or decrypt data received from or both transmit said data to and decrypt said data received from said one or more combined systems that utilize one or more master keys comprising:

at least one encrypter or decrypter or both an encrypter and a decrypter that encrypt or decrypt or both encrypt and decrypt said data or associated data files or both said data and said associated data files that utilize one or more master keys and one or more key selectors, where said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files, and wherein said key selectors and said created cipher data and said created cipher data files produce result data and result data files where said created cipher data and said created cipher data files together with said result data and said result data files are sealed which provides for produced encrypted data and encrypted data files to only be encrypted and decrypted with one or more said master keys and one or more said key selectors, wherein said master keys are executable coded cipher keys and wherein said data or said associated data files or both said data and said associated data files are a form of transmission(s) that are signals and one or more combined systems further comprise:

a forward error correction encoder that encodes transmission(s) and provides a known degree of forward error correction to encoded transmission(s);

a sub-channel encoder;

a transmission(s) combiner that combines said encoded transmission(s) from said forward error correction encoder with transmission(s) from said sub-channel encoder;

a transmission(s) encrypter that receives combined transmission(s) from said transmission(s) combiner, wherein said transmission(s) encrypter receives one or more encrypter keys (KE) and said combined transmission(s), where said combined transmission(s) are encrypted by said transmission(s) encrypter and sent to a transmission(s) transmitter and wherein said combined transmission(s) are in a form of cipher text;

a transmission(s) receiver that receives said cypher text and sends said cypher text to a transmission(s) decrypter, where said cypher text is decrypted and wherein said one or more combined systems further comprise;

at least one executable coded cipher key(s), and at least one executable coded encryption key (ECEK) device that encrypts transmission(s) that uses executable coded cipher key(s), and at least one executable coded decryption key (ECDK) device that decrypts transmission(s) that also uses said at least one executable coded cipher key(s), where a combined device is a randomized decrypted data with sub-channels (RDDS)/(ECDK) device that transmits randomized encrypted data with data sub-channels and with executable coded encryption keys;

at least one computer processing unit (CPU) with computational capabilities that is connected to and controls a computer memory via an address bus and a data bus wherein said address bus accesses a designated range of computer memories and range of memory bits and said data bus provides a flow of transmission(s) into and out of said CPU and computer memory, and wherein said computer memory contains encrypter/decrypter memory that possesses at least one encryption space location and at least one decryption space location for said executable coded cipher key(s), where transmission(s) is sent to said encrypter/decrypter memory that stores said transmission(s) while said transmission(s) is encrypted or decrypted or both encrypted and decrypted and when encryption/decryption is completed said encrypted or decrypted or both encrypted and decrypted transmission(s) is sent to at least one transmitter where encryption/decryption of said encrypted or decrypted or both encrypted and decrypted transmission(s) is controlled and manipulated by said executable coded cipher key(s), wherein said executable coded cipher key(s) remains in said computer memory and achieves encryption/decryption completion.

7. The one or more combined systems of claim 6, wherein said key selectors are encrypted and decrypted.

8. The one or more combined systems of claim 6, wherein said executable cipher keys contain meta data.

9. The one or more combined systems of claim 6, comprising a real or virtual master distributed auto-synchronous array (DASA) database or both one or more real and one or more virtual master distributed auto-synchronous array (DASA) databases located within or external to said one or more combined systems that at least stores and retrieves data and that includes at least two or more partial distributed auto-synchronous array (DASA) databases wherein said partial DASA databases function in either an independent manner, a collaborative manner or both an independent and collaborative manner, and wherein said real or virtual master and partial DASA databases allow for bi-directional transmission of data to and from multiple partial user devices, to and from multiple partial access devices or to and from both partial user and partial access devices, wherein said user and said access devices are computing devices and wherein one or more partial user and one or more partial access devices store and provide at least partial copies of portions of said master DASA database and wherein said master DASA database, said partial DASA databases or both said partial and said master DASA databases are linked and communicate with each other as well as inclusion of one or more logging and monitoring databases that provide statistical and numerical calculations utilizing data, wherein tools authenticate using a first set of computing operations, validate using a second set of computing operations, and wherein a third set of computing operations controls access for a specified set of users.

10. The one or more combined systems of claim 9, wherein said master and partial DASA databases analyze and provide information in a form of data and act to control one or more output devices, wherein said output devices are computing devices and, wherein said one or more output devices create user devices.

\* \* \* \* \*